United States Patent [19]

Masunaga

[11] Patent Number: 5,300,184
[45] Date of Patent: Apr. 5, 1994

[54] PRESS ROLL APPARATUS FOR MANUFACTURING LAMINATED GLASS

[75] Inventor: Hiroaki Masunaga, Kyoto, Japan
[73] Assignee: Nippon Sheet Glass Co., Ltd., Japan
[21] Appl. No.: 903,985
[22] Filed: Jun. 24, 1992
[30] Foreign Application Priority Data

Jun. 24, 1991 [JP] Japan ................ 3-178691

[51] Int. Cl.⁵ .............................. B32B 31/20
[52] U.S. Cl. ....................... 156/582; 156/106; 156/583.91; 100/155 G; 100/160; 100/162 B; 100/168; 100/169; 100/170; 100/173; 100/176
[58] Field of Search ............ 156/104, 106, 107, 109, 156/581, 582, 583.91; 100/155 G, 160, 162 B, 168, 169, 170, 173, 176

[56] References Cited

U.S. PATENT DOCUMENTS

| | | | |
|---|---|---|---|
| 2,849,345 | 8/1958 | Smith et al. | 156/104 |
| 3,048,214 | 8/1962 | Madge et al. | 156/443 |
| 4,327,634 | 5/1982 | Colmon et al. | 156/582 |
| 4,696,713 | 9/1987 | Okafuji et al. | 156/358 |
| 4,865,671 | 9/1989 | Bishop et al. | 156/104 |
| 4,988,398 | 1/1991 | Pereman et al. | 156/64 |

FOREIGN PATENT DOCUMENTS 2053104 4/1971 France .
0290344 11/1988 France .

Primary Examiner—Caleb Weston
Attorney, Agent, or Firm—Merchant, Gould, Smith, Edell, Welter & Schmidt

[57] ABSTRACT

A press roll apparatus temporarily or finally bonds two glass sheets with an adhesive intermediate film sandwiched therebetween to manufacture a laminated glass. The press roll apparatus has a plurality of drive roll units each having a pair of upper and lower presser rolls operatively coupled to a drive source and rotatable thereby for pressing the glass sheets therebetween, and a plurality of free roll units each having a pair of upper and lower presser rolls freely rotatable for pressing the glass sheets therebetween. The drive roll units and the free roll units are housed in a frame and vertically positionally adjustably supported by the frame, the frame having a pair of horizontal shafts projecting outwardly. The frame is supported on a support frame by the horizontal shafts for angular movement about the horizontal shafts, the support frame having a pair of horizontally spaced vertical support columns. A pair of vertically movable members is vertically movably supported by the support columns, respectively. The horizontal shafts are tiltably supported by the vertically movable members for angular movement within a vertical plane containing axes of the horizontal

10 Claims, 34 Drawing Sheets

(a)

(b)

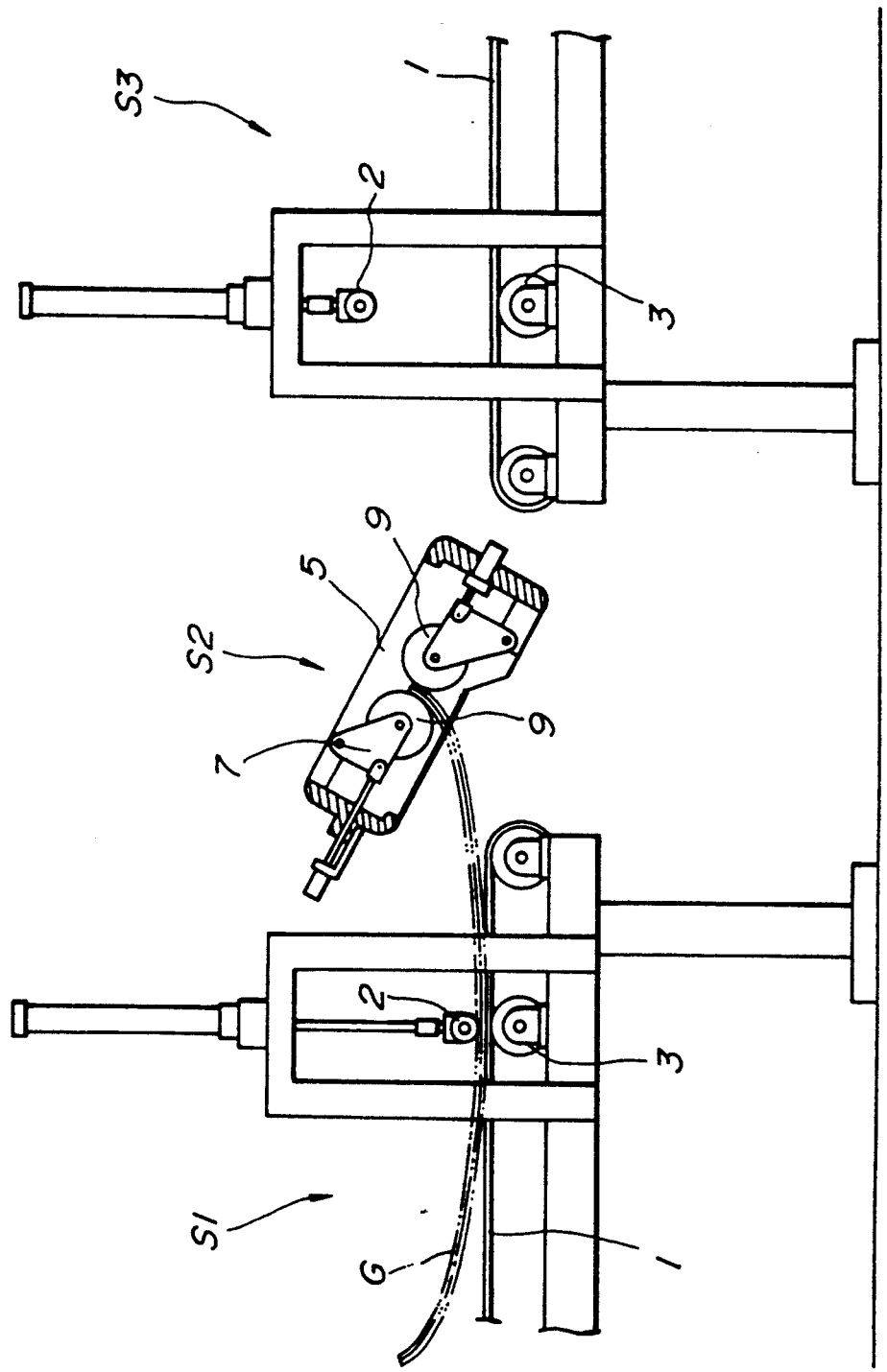

FIG. 34
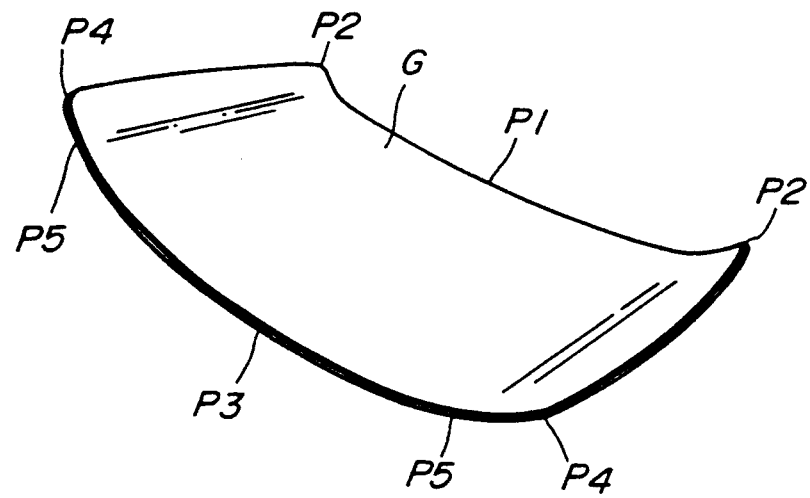
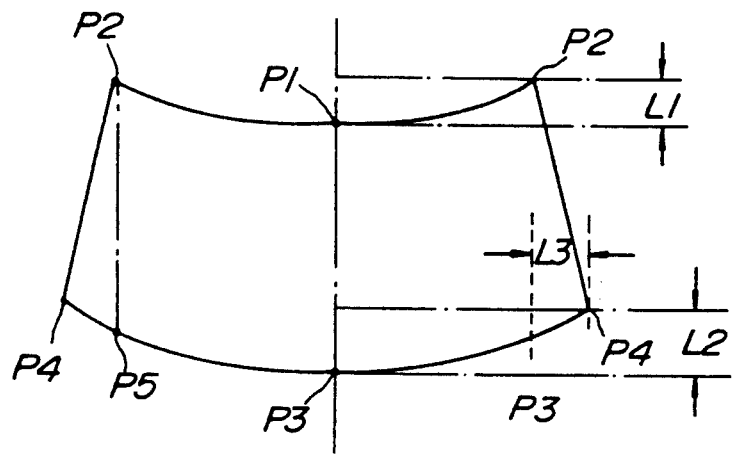
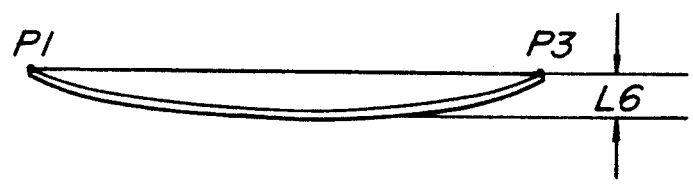
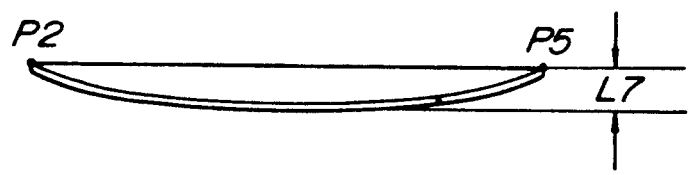
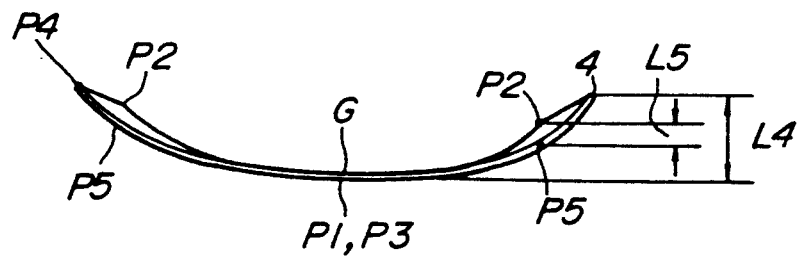

PRESS ROLL APPARATUS FOR MANUFACTURING LAMINATED GLASS

BACKGROUND OF THE INVENTION

1. Field of the Invention

The present invention relates to a press roll apparatus for pressing two glass sheets toward each other with an intermediate film sandwiched as an adhesive layer therebetween, so that the glass sheets can be temporarily bonded to each other by the intermediary film.

2. Description of the Relevant Art

Laminated glass for use as automobile front windshields is manufactured by a press roll apparatus which presses two glass sheets toward each other with an intermediate film as of polyvinyl butyral sandwiched therebetween, thus temporarily bonding the two glass sheets After the two glass sheets are temporarily bonded to each other, they are finally bonded in an autoclave.

One known press roll apparatus is disclosed in U.S. Pat. No. 4,696,713 (corresponding to Japanese laid-open patent publication No. 63-65624).

The disclosed press roll apparatus has a plurality of drive and free roll units that can independently move vertically, but fail to swing as a whole in directions perpendicular to the direction in which two glass sheets are inserted.

The free roll units have presser rolls which are swingable in directions normal to the direction in which two glass sheets are fed, so that the presser rolls can follow the shape of the glass sheets. The drive roll units also have presser rolls that are not swingable because of gears used to transmit drive power to the presser rolls Therefore, it has been difficult for the prior press roll apparatus to bond glass sheets of complex shape to each other.

The drive power is transmitted to only one of the presser rolls of each of the drive roll units to prevent undue forces from being imposed on the glass sheets as they are fed through the drive roll units However, the presser rolls of the drive roll units tend to slip against the glass sheets.

SUMMARY OF THE INVENTION

It is an object of the present invention to provide a press roll apparatus for manufacturing laminated glass, which can temporarily bond two glass sheets of complex shape reliably to each other.

According to the present invention, there is provided a press roll apparatus for temporarily or finally bonding two glass sheets with an adhesive intermediate film sandwiched therebetween to manufacture a laminated glass, the press roll apparatus comprising a drive source, a plurality of drive roll units each having a pair of upper and lower presser rolls operatively coupled to the drive source and rotatable by the drive source for pressing the glass sheets therebetween, a plurality of free roll units each having a pair of upper and lower presser rolls freely rotatable for pressing the glass sheets therebetween, a frame housing the drive roll units and the free roll units therein, the drive roll units and the free roll units being vertically positionally adjustably supported by the frame, the frame having a pair of horizontal shafts projecting outwardly, a support frame, the frame being supported on the support frame by the horizontal shafts for angular movement about the horizontal shafts, the support frame having a pair of horizontally spaced vertical support columns, and a pair of vertically movable members vertically movably supported by the support columns, respectively, the horizontal shafts being tiltably supported by the vertically movable members for angular movement within a vertical plane containing axes of the horizontal shafts.

Each of the upper and lower presser rolls of the free roll units is freely rotatable about a first axis and swingable about a second axis perpendicular to the first axis, the second axis being positioned closer to the glass sheets pressed between the upper and lower presser rolls of the free roll units than the first axis.

The press roll apparatus further includes a mechanism for setting a vertical position for at least one of the drive roll units and the free roll units while permitting the set vertical position to be canceled.

The frame comprises a main frame and a subframe, the subframe comprising a plurality of subframe elements supporting the drive roll units, respectively, further including a plurality of balancing cylinders and a plurality of balancing springs which support the subframe elements respectively. One of the upper and lower presser rolls of each of the free roll units is vertically movably mounted on one of the subframe elements, and the other of the upper and lower presser rolls of each of the free roll units is fixedly mounted on the one of the subframe elements. The subframe is suspended by the main frame, the subframe elements being associated respectively with the drive roll units and the free roll units, each of the subframe elements comprising a pair of channel-shaped frame members.

Each of the upper and lower presser rolls of the drive roll units has an axially central small-diameter portion, and power transmitting means including a driven member mounted on the small-diameter portion for transmitting drive power from the drive source to the presser roll, each of the upper and lower presser rolls of the drive roll units being freely rotatable about a first axis and swingable about a second axis perpendicular to the first axis. The driven member comprises a driven sprocket smaller in diameter than the upper and lower presser rolls of the drive roll units. The power transmitting means comprises a pair of drive shafts operatively coupled to the drive source and extending parallel to the first axes of the upper and lower presser rolls of the drive roll units.

According to the present invention, there is also provided a press roll apparatus for manufacturing a laminated glass from two glass sheets with an adhesive intermediate film sandwiched therebetween, comprising a pressing station for finally or temporarily bonding the two glass sheets with the adhesive intermediate film sandwiched therebetween under pressure, a loading station, disposed upstream of the pressing station with respect to a direction in which the glass sheets are fed, for loading the two glass sheets with the adhesive intermediate film sandwiched therebetween into the pressing station, and an unloading station, disposed downstream of the pressing station with respect to the direction, for unloading the bonded two glass sheets with the adhesive intermediate film sandwiched therebetween from the pressing station, the pressing station comprising a plurality of drive roll units for drawing the two glass sheets with the adhesive intermediate film sandwiched therebetween from the loading station, pressing the two glass sheets with the adhesive intermediate film sandwiched therebetween, and delivering the two glass sheets with the adhesive intermediate film sandwiched therebetween to the unloading station, and a plurality of free roll units for pressing the two glass sheets with the adhesive intermediate film sandwiched therebetween according to a shape of the two glass sheets, the drive roll units and the free roll units being movable as a whole perpendicularly to the direction.

The loading station comprises conveyor means extending in the direction for feeding the two glass sheets with the adhesive intermediate film sandwiched therebetween, and transfer means for transferring the two glass sheets with the adhesive intermediate film sandwiched therebetween from the conveyor means to the pressing station, the transfer means comprising a pair of rails extending substantially parallel to the conveyor means, a movable member movable along the rails to a position closer to the pressing station than a distal end of the conveyor means, a plurality of bearing rollers supported on the movable member for lifting the two glass sheets with the adhesive intermediate film sandwiched therebetween off the conveyor means, and a plurality of presser rollers for holding the two glass sheets with the adhesive intermediate film sandwiched therebetween against the bearing rollers.

The above and further objects, details and advantages of the present invention will become apparent from the following detailed description of a preferred embodiment thereof, when read in conjunction with the accompanying drawings.

BRIEF DESCRIPTION OF THE DRAWINGS

FIG. 32 is a front elevational view of a conventional press roll apparatus;

FIG. 34 shows a laminated glass for use as an automobile front windshield.

DETAILED DESCRIPTION

For an easier understanding of the present invention, the conventional press roll apparatus disclosed in U.S. Pat. No. 4,696,713 will first be described below with reference to FIGS. 31B through 34.

The term "laminated glass" used herein means two glass sheets with an intermediate film sandwiched therebetween which are temporarily or finally bonded together under pressure.

Figure 33:
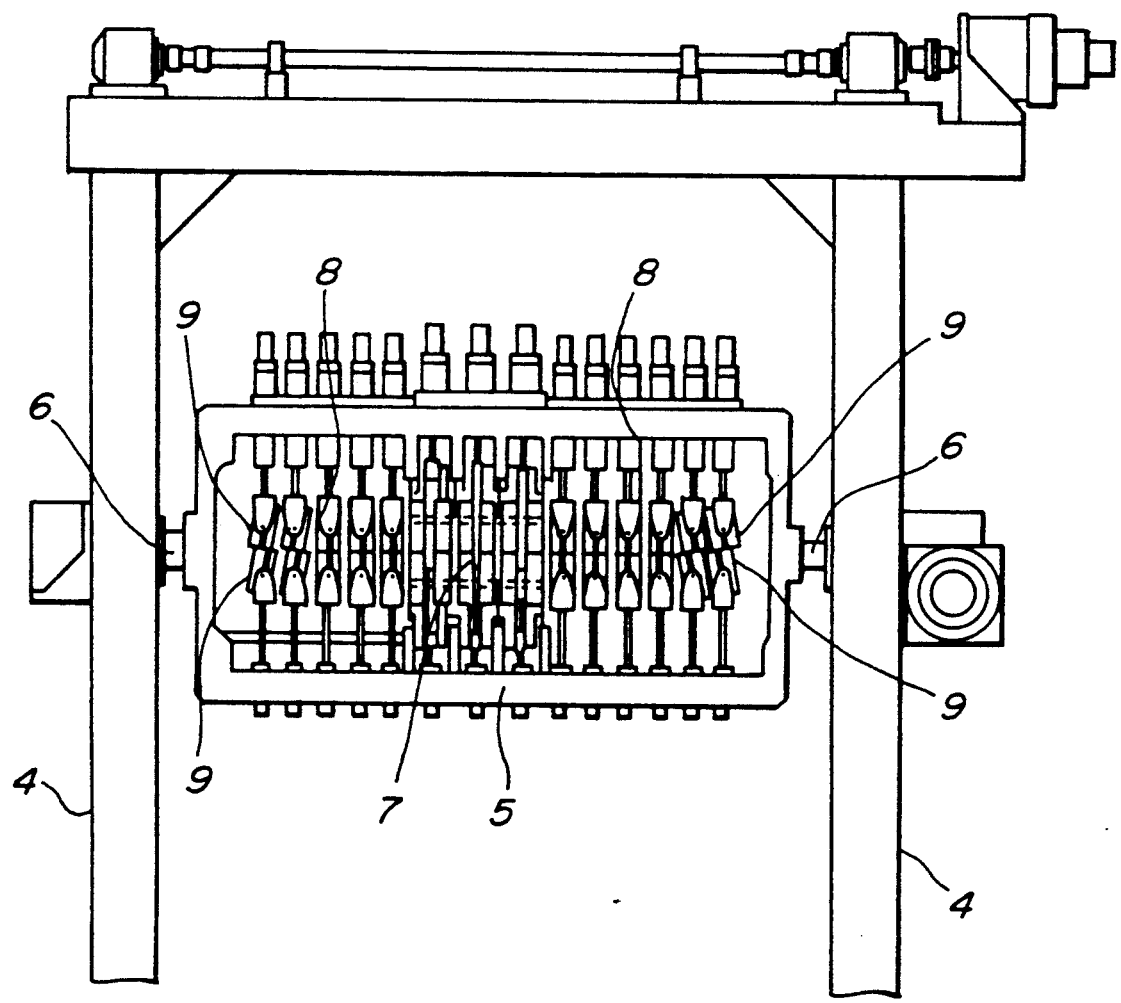
FIG. 33 is a side elevational view of a pressing station of the conventional press roll apparatus.

As shown in FIGS. 32 and 33, the conventional press roll apparatus has a loading station S1, an unloading station S3, and a pressing station S2 positioned between the loading and unloading stations S1, S3. Each of the loading and unloading stations S1, S3 has a belt conveyor 1 for feeding two glass sheets G with an intermediate film sandwiched therebetween, a presser roller 2 for delivering the glass sheets G, and a bearing roller 3 for bearing the glass sheets G. The pressing station S2 has a pair of laterally spaced support columns 4 and a frame 5 vertically movably supported at its opposite lateral ends by the support columns 4 and angularly movable about horizontal shafts 6. The pressing station S2 comprises a plurality of drive roll units 7 and a plurality of free roll units 8 which are mounted on the frame 5. The vertical positions of these roll units 7, 8 are independently variable depending on the shape of the glass sheets G.

FIG. 34 shows the shape of a recent laminated glass LG for use as an automobile front windshield. The laminated glass LG includes an upper edge having an intermediate point P1 and opposite end points P2, and a lower edge having an intermediate point P3 and opposite end points P4. Straight lines which lie parallel to a straight line passing through the intermediate points P1, P3 and which also pass the points P2 intersect with the lower edge at respective points P5. The vertical distance L1 between the points P1, P2, the vertical distance L2 between the points P3, P4, the horizontal distance L3 between the points P4, P5, the transverse distance L4 between the points P3, P4, the transverse distance L5 between the points P2, P5, the transverse distance L6 between a line interconnecting the points P1, P3 and a convex bottom surface of the laminated glass LG, and the transverse distance L7 between a line interconnecting the points P2, P5 and the convex bottom surface of the laminated glass LG are relatively large, making the laminated glass LG complex in shape.

When the glass sheets G are to be temporarily bonded to each other and pressed into the laminated glass LG of complex shape with the conventional press roll apparatus, the following problems arise:

(1) If the transverse distance L5 between the points P2, P5 is relatively small, then the glass sheets G can be shaped into the laminated glass LG by the individual roll units of the press roll apparatus as they vertically move. If the transverse distance L5 is relatively large, however, the vertical movement of the roll units may be insufficient to shape the glass shape the glass sheets G into the laminated glass LG, imposing undue stresses on the glass sheets G.

Figure 31A:
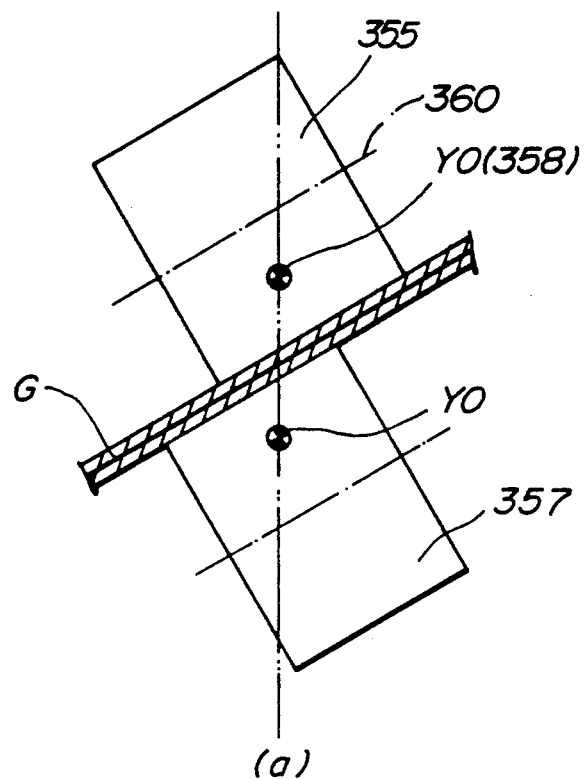
FIG. 31A is a view showing the manner in which the presser rolls of a free roll unit according to the present invention move.
Figure 31B:
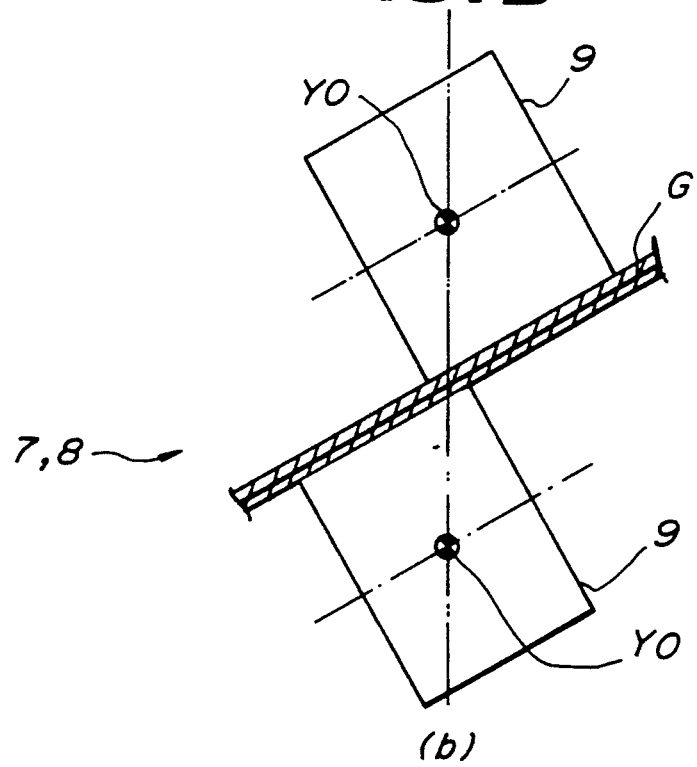
FIG. 31B is a view showing the manner in which the presser rolls of a conventional free roll unit move.

(2) As shown in FIG. 31B, the glass sheets G are pressed and bonded to each other by a pair of upper and lower presser rolls 9 of each of the roll units 7, 8. The laterally opposite curved portions of the glass sheets G are pressed by corresponding presser rolls 9 which swing about axes YO that are positioned at the same heights as the axes of rotation of the presser rolls 9 with respect to the glass sheets G. Since, however, only overlapping portions of the presser rolls 9 apply the effective pressure to the glass sheets G, if the laterally opposite portions of the glass sheets G are of a largely curved shape, the areas of the glass sheets G which are actually pressed by the presser rolls 9 are small, and hence the glass sheets G cannot sufficiently be bonded in those laterally opposite portions.

(3) The drive roll units 7 and the free roll units 8 are vertically movable, following the shape of the glass sheets G, under very small forces by balancing cylinders, so that they do not impose undue stresses to the glass sheets G. The conventional press roll apparatus has no mechanism for positioning the roll units 7, 8 when the glass sheets G are not positioned between the upper and lower presser rolls 9. Consequently, it is difficult to insert new glass sheets G between the upper and lower presser rolls 9. A numerical control process may be employed to control the height of the individual roll units 7, 8, but would be complicated because there is no reference position for the roll units 7, 8.

(4) The drive roll units 7 and the free roll units 8 are suspended by balancing springs so that they can be moved vertically under very small forces by the balancing cylinders. Balancing forces applied to the roll units 7, 8 are however largely variable depending on the stroke of the balancing cylinders.

(5) The glass sheets G are automatically inserted from the loading station S1 into a position between the upper and lower presser rolls 9 of the drive roll unit 7. As shown in FIG. 34, the recent laminated glass LG is of a deeply curved configuration In forming such deeply curved laminated glass LG, difficulty is experienced in inserting the leading end of the glass sheets G between the upper and lower presser rolls 9 even though the presser rolls 9 are allowed to move vertically by the balancing springs and the drive roll units 8 are swingable as a whole.

(6) The individual roll units 7, 8 are vertically movable independently of each other. However, the roll units 7, 8 cannot swing as a whole in directions perpendicular to the direction in which the glass sheets G are inserted.

(7) The presser rolls 9 of the free roll units 8 are swingable to follow the shape of the glass sheets G, in directions perpendicular to the direction in which the glass sheets G are fed. However, the presser rolls 9 of the drive roll units 7 are not swingable because of gears used to transmit drive power to these presser rolls 9. Therefore, it has been difficult for the prior press roll apparatus to bond glass sheets G of complex shape to each other.

(8) The drive power is transmitted to only one of the presser rolls 9 of each of the drive roll units 7 to prevent undue forces from being imposed on the glass sheets G as they are fed through the drive roll units 7. However, the presser rolls 9 of the drive roll units 7 tend to slip against the glass sheets.

(9) As the shape of the glass sheets G to be processed by the press roll apparatus becomes more and more complex, they have different positions (corresponding to the point P4 in FIG. 34) where they first get pressed by the drive roll units 7. The number of drive roll units may be increased to cover every such position, but the press roll apparatus would be required to be large in size.

(10) If the distance between the loading station S1 and the pressing station S2 were too small, the frame 5 and the belt conveyor 1 would physically interfere with each other. Conversely, if the loading station S1 and the pressing station S2 were spaced too widely from each other, the presser roller 2 and the bearing roller 3 would be required to continuously support and deliver the glass sheets G by themselves until the trailing end of the glass sheets G passes these rollers 2, 3. This would pose a certain problem as follows: Inasmuch as the glass sheets G are curved in the direction in which they are fed, the leading end of the glass sheets G would move upwardly as they are continuously supported and delivered by the rollers 2, 3. As a result, the leading end of the glass sheets G follows a curved path, but not a straight path. The process for controlling the drive roll units 7 to enable their presser rolls 9 to catch the leading end of the glass sheets G would therefore be highly complicated.

A press roll apparatus according to the present invention is designed to eliminate the drawbacks described above. The press roll apparatus according to the present invention will hereinafter be described below with reference to FIGS. 1 through 31A.

Figure 1:
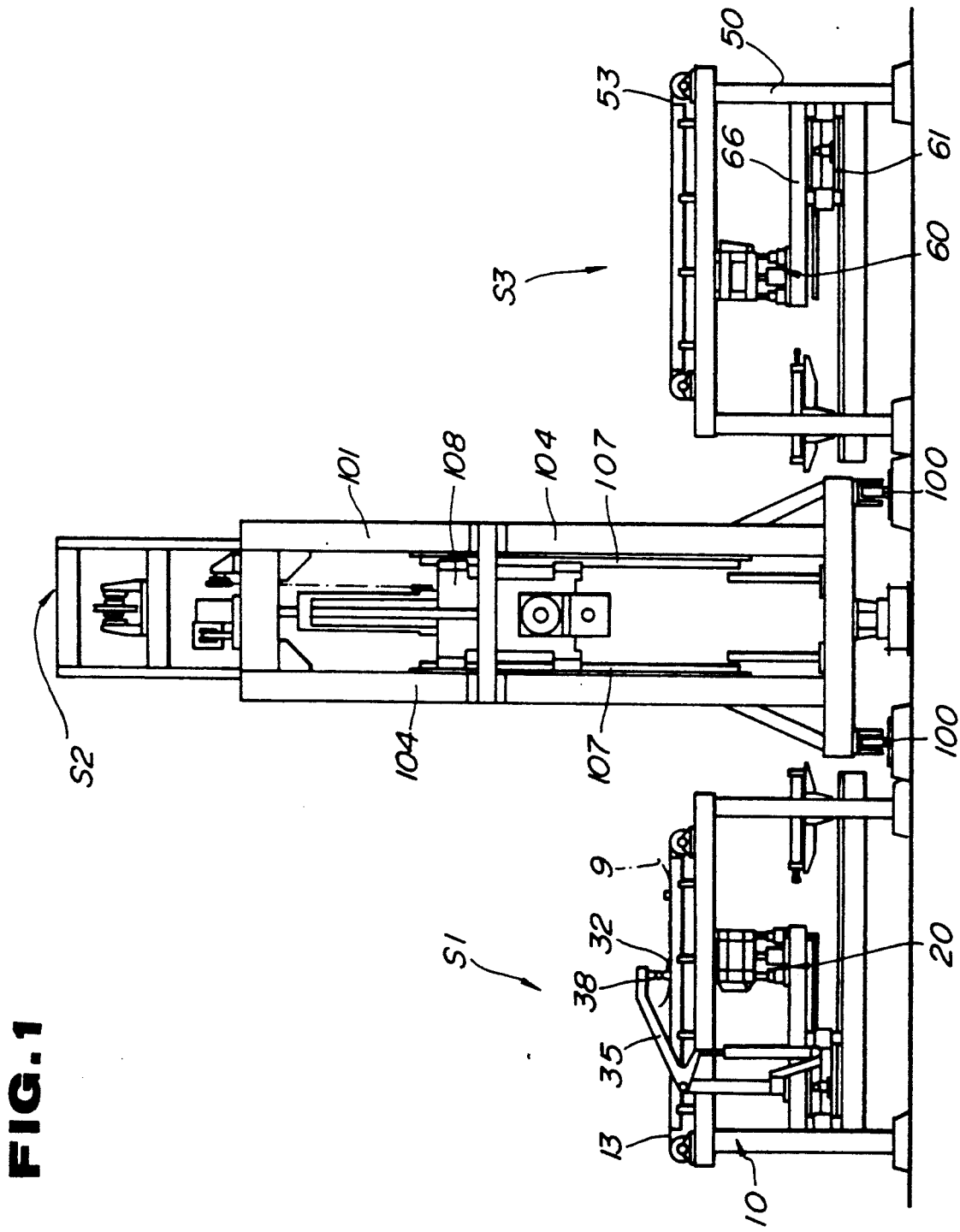
FIG. 1 is a front elevational view of a press roll apparatus for manufacturing laminated glass according to the present invention.
Figure 2:
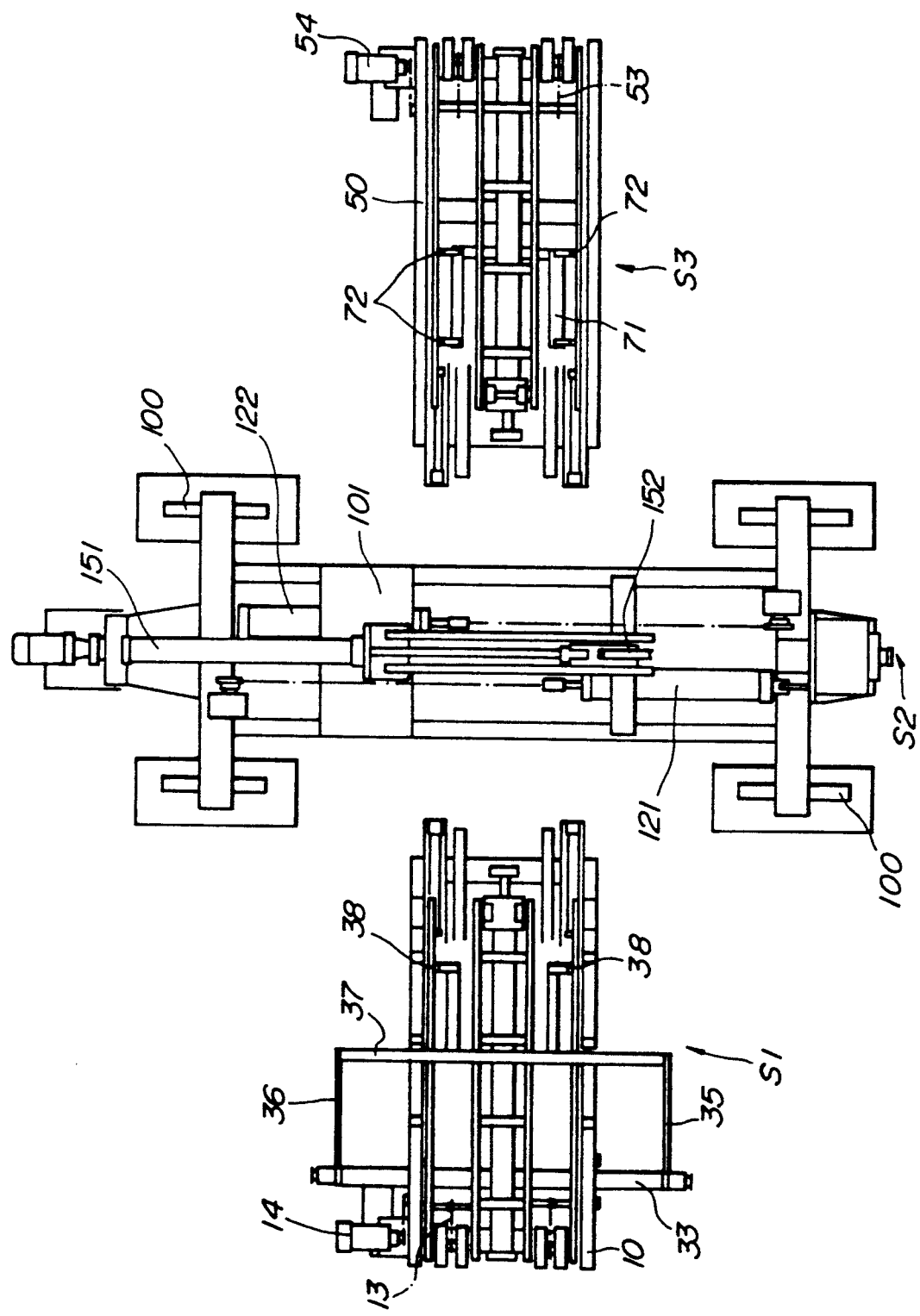
FIG. 2 is a plan view of the press roll apparatus.

As shown in FIGS. 1 and 2, the press roll apparatus generally comprises a loading station S1, an unloading station S3, and a pressing station S2 positioned between the loading and unloading stations S1, S3.

Figure 3:
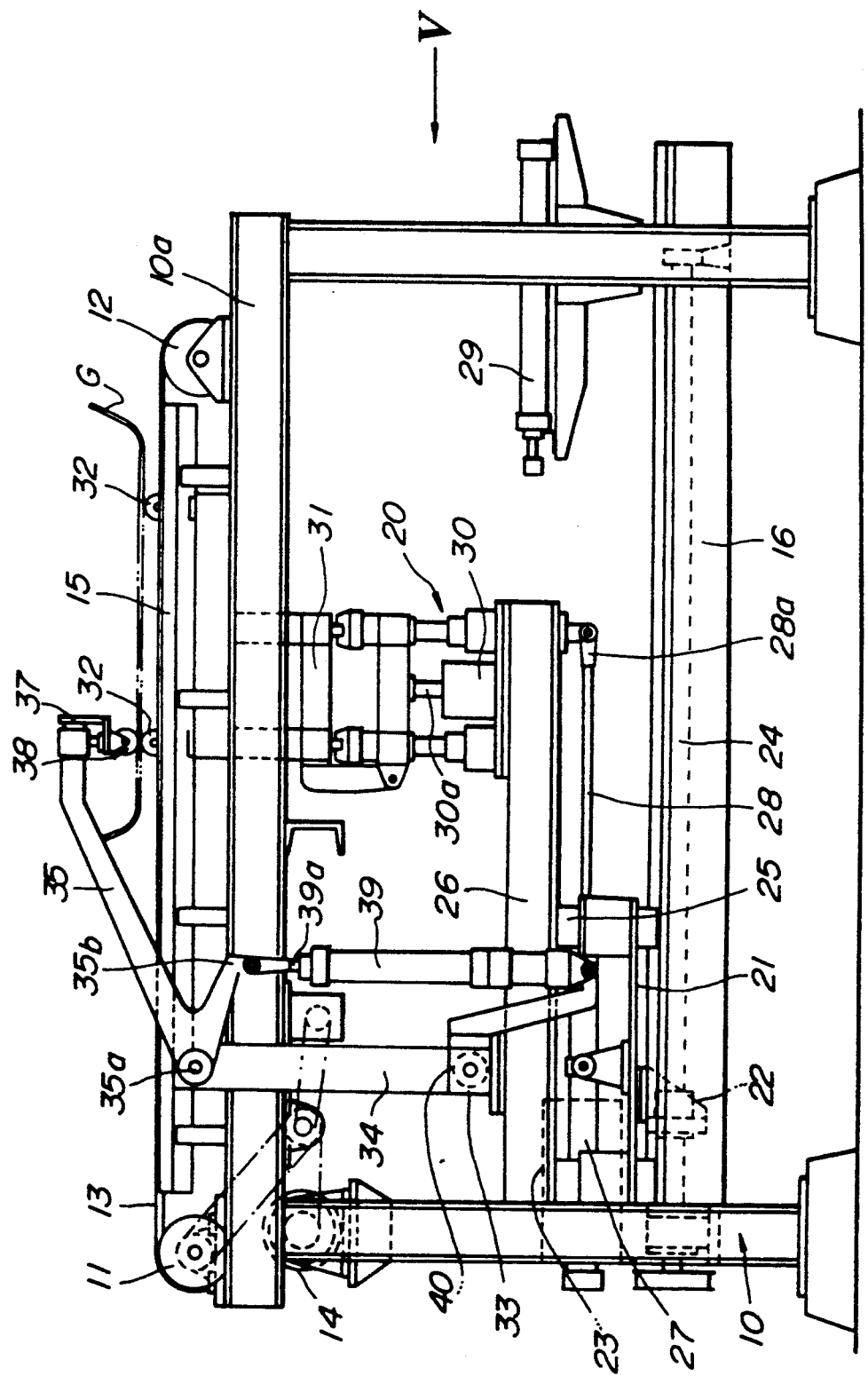
FIG. 3 is a front elevational view of a loading station of the press roll apparatus.
Figure 4:
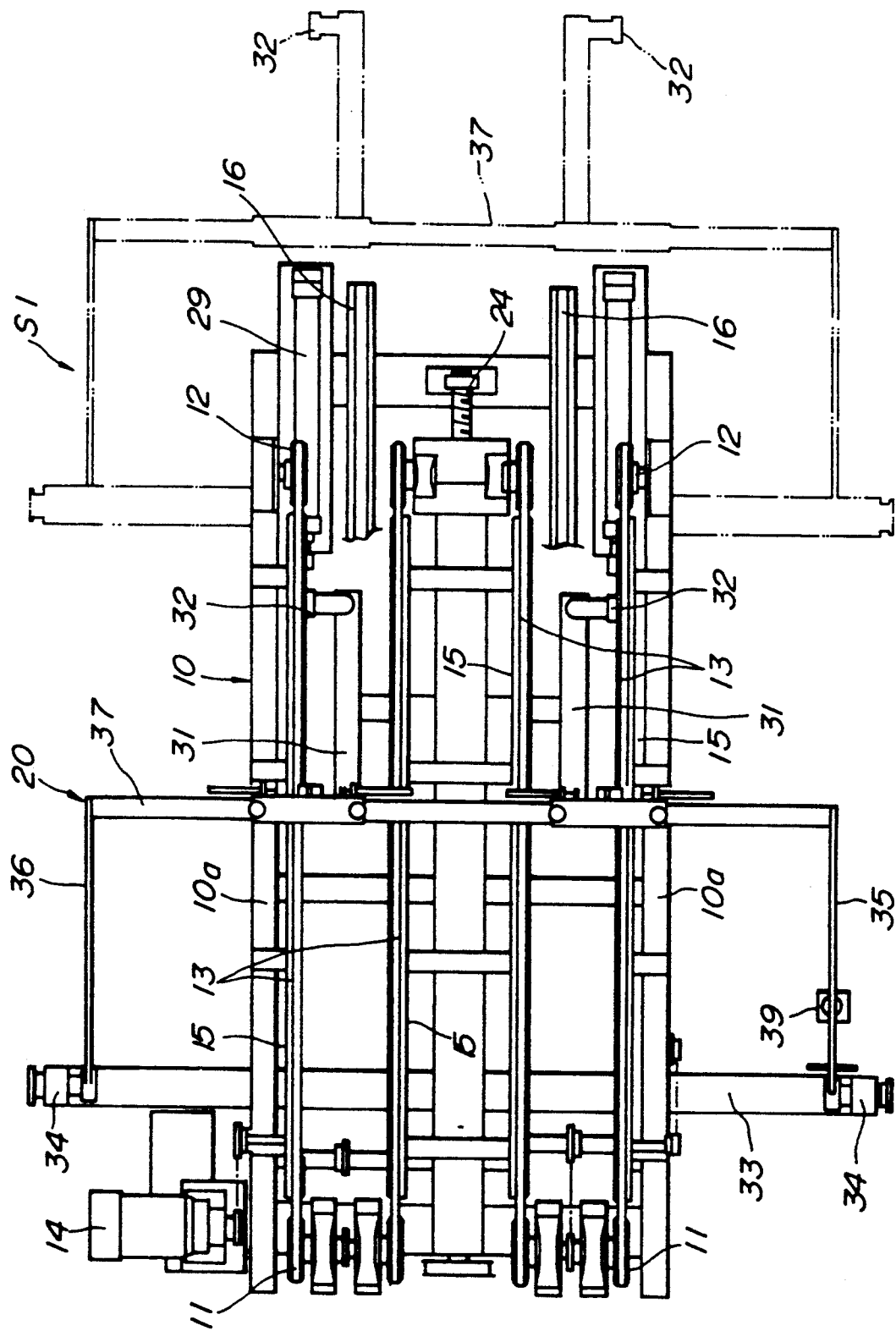
FIG. 4 is a plan view of the loading station.
Figure 5:
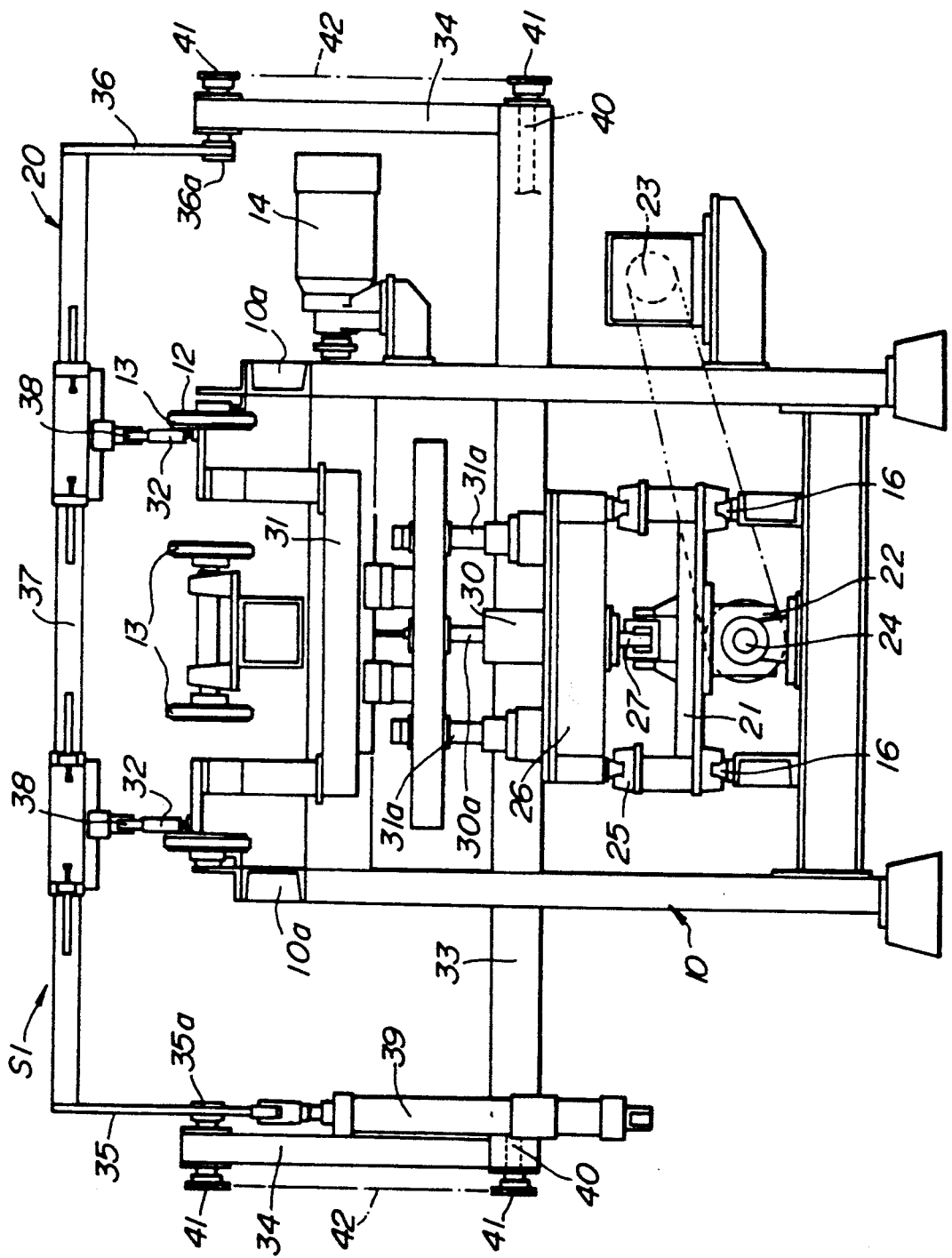
FIG. 5 is a side elevational view of the loading station as viewed in the direction indicated by the arrow V in FIG. 3.

As shown in FIGS. 3, 4, and 5, the loading station S1 has a support frame 10 including an upper member 10a that supports drive pulleys 11 and driven pulleys 12 around which conveyor belts 13 are trained. A motor 14 is mounted on the support frame 10 below the drive pulleys 11, and the drive pulleys 11 are operatively coupled to the motor 14 by a power transmitting mechanism composed of chains and sprockets. When the drive pulleys 11 are rotated by the motor 14, the conveyor belts 13 run along guides 15 on the upper member 10a of the support frame 10.

A pair of laterally spaced rails 16 is mounted on the support frame 10 below and parallel to the conveyor belts 13. A transfer device 20 for transferring glass sheets G is movably supported on the rails 16.

As shown in FIGS. 3 and 5, the transfer device 20 is slidably mounted on the rails 16 by a first slider 21 that is held in sliding engagement with the rails 16. A nut 22 attached to the lower surface of the first slider 21 is threaded over a screw shaft 24 rotatably supported on the support frame 10 for rotation about its own axis by a motor 23 that is also supported on the support frame 10. When the motor 23 is energized, the first slider 21 moves to the left or right in FIG. 3 along the screw shaft 24

A pair of laterally spaced rails 25 is mounted on the slider 21, and a second slider 26 slidingly engages the rails 25. A cylinder unit 27 fixedly mounted on the first slider 21 has a rod 28 extending parallel to the screw shaft 24. The rod 28 has a distal end 28a coupled to the lower surface of the second slider 26. When the cylinder unit 27 is actuated, the second slider 26 is moved toward the pressing station S2 which is positioned on the righthand side of the loading station S1 in FIG. 3. With the second slider 26 thus moved toward the pressing station S2, the transfer device 20 is moved as a whole by the motor 23 to a position closer to the pressing station S2 than the distal end of the conveyor belts 13.

A cylinder unit 29 is mounted on the support frame 10 at an end thereof close to the pressing station S2. The cylinder unit 29 serves as a safety device. Each time a frame 200 (see FIG. 10) of the pressing station S2 is tilted a certain angle, e.g., 5°, as indicated by the imaginary lines in FIG. 8, the cylinder unit 29 projects its rod. More specifically, in the event of a failure of the motor 23, the transfer device 20 may remain stuck in a position in the way of angular movement of the frame 200, and would be hit by the frame 200, resulting in damage to the apparatus. Therefore, regardless of whether the transfer device 20 is stopped in the way or not, the cylinder unit 29 is actuated each time the frame 200 is tilted If the transfer unit 20 is positioned within the operating range of the cylinder unit 29, then the cylinder unit 29 as actuated retracts the transfer device 20 out of its operating range against the force from the cylinder unit 27. When thus retracted, the transfer device 20 is also out of the range of angular movement of the frame 200. Therefore, the transfer device 20 is prevented from physically interfering with the frame 200.

A vertical cylinder unit 30 is mounted on a front portion (on the righthand side in FIG. 3) of the second slider 26. The cylinder unit 30 has a rod 30a attached to a lifter 31 which supports a plurality of front and rear bearing rollers 32 on its upper end.

When the cylinder unit 30 is contracted, the lifter 31 is lowered positioning the bearing rollers 32 beneath the conveyor belts 13. When the cylinder unit 30 is extended, the lifter 31 is elevated to a position in which the bearing rollers 32 are positioned above the conveyor belts 13. The lifter 31 is guided by guide bars 31a for its vertical movement.

The second slider 26 supports on its rear portion (on the lefthand side in FIG. 3) a horizontal elongate hollow frame 33 extending laterally. Upstanding support columns 34 are mounted on the respective opposite ends of the frame 33. An angular arm 35 is vertically angularly movably supported on the upper end of one of the support columns 34 by a support shaft 35a, and a bar-like arm 36 is vertically angularly movably supported on the upper end of the other support column 34 by a support shaft 36a. A bar 37 extends between and is joined to the distal ends of the arms 35, 36, and presser rollers 38 are supported on the bar 37.

A vertical cylinder 39 is mounted on one of the opposite ends of the frame 33 and has a rod 39a whose distal end is coupled to the other end 35b of the angular arm 35.

A shaft 40 extends through the frame 33 and has its opposite ends operatively coupled to the arms 35, 36 through pulleys 41 and timing belts 42. Therefore, when the cylinder unit 39 is actuated, the angular movement of the angular arm 35 is transmitted through the pulleys 41, the timing belts 42, and the shaft 40 to the other arm 36.

When the cylinder unit 39 is extended to turn the bar 37 upwardly and the cylinder unit 30 is contracted to lower the bearing rollers 32 on the lifter 31 below the conveyor belts 13, two glass sheets G which have not yet been bonded to each other are fed onto the conveyor belts 13.

Then, the cylinder unit 30 is extended to elevate the lifter 31 causing the bearing rollers 32 to lift the glass sheets G off the conveyor belts 13. The cylinder unit 39 is contracted to turn the arms 35, 36 and hence the bar 37 downwardly causing the presser rollers 38 to move toward the rear bearing rollers 32 (on the lefthand side in FIG. 3). Opposite lateral sides of the glass sheets G are now gripped between the rollers 38, 32, as shown in FIG. 3.

Thereafter, the motor 23 is energized to move the sliders 21, 26 toward the pressing station S2 until the leading end (on the righthand side in FIG. 3) of the glass sheets G is inserted between upper and lower presser rolls of drive roll units (described later on) of the pressing station S2. Since the opposite lateral sides of the glass sheets G are gripped between the rollers 38, 32, the leading end of the glass sheets G is prevented from vibrating, and can smoothly be inserted between the upper and lower presser rolls of the drive roll units The unloading station S3 is shown in detail in FIGS. 6 and 7. The unloading station S3 is substantially identical in structure to the loading station S1. However, the unloading station S3 does not have members corresponding to the presser rollers 38 and associated members as the unloading station S3 simply receives and transfers the glass sheets G to a next processing station (not shown) and does not positively position the received glass sheets G.

The unloading station S3 has a support frame 10 supporting drive pulleys 51 and driven pulleys 52 on an upper member thereof Conveyor belts 13 that are caused to travel along guides 50 by a motor 54 are trained around the drive and driven pulleys 51, 52. The unloading station S3 includes a transfer device 50 for transferring glass sheets G which is movably supported on rails 56 mounted on a lower portion of the support frame 10. The transfer device 50 is of a structure identical to the transfer device 20 of the loading station S1.

The transfer device 50 is slidably mounted on the rails 56 by a first slider 61 that is held in sliding engagement with the rails 56. A nut 62 attached to the lower surface of the first slider 61 is threaded over a screw shaft 64 rotatable by a motor 63. A pair of laterally spaced rails 65 is mounted on the slider 61, and a second slider 66 slidingly engages the rails 65. A cylinder unit 67 fixedly mounted on the first slider 61 has a rod 68 having a distal end 68a coupled to the lower surface of the second slider 66.

Figure 6:
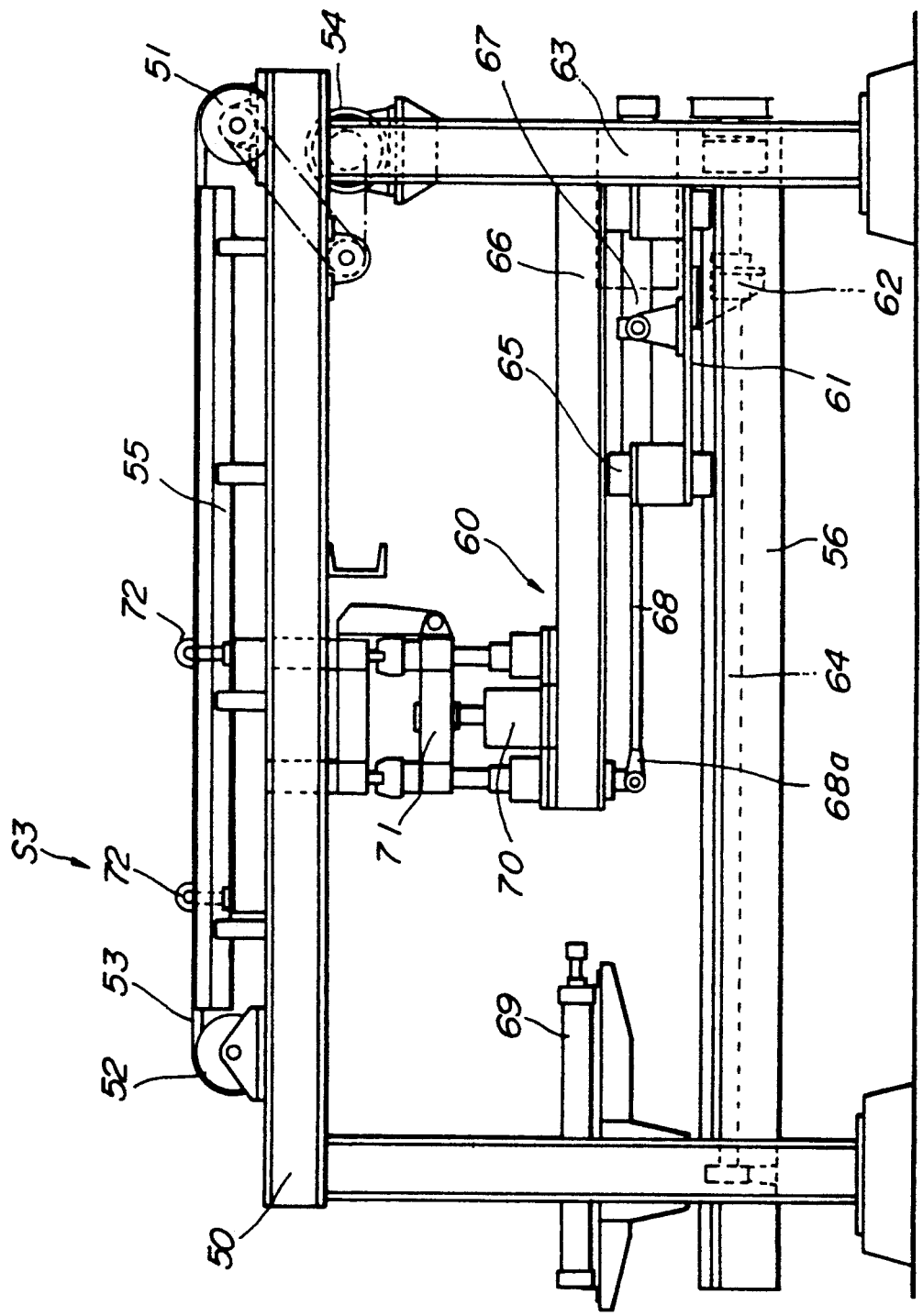
FIG. 6 is a front elevational view of an unloading station of the press roll apparatus.
Figure 7:
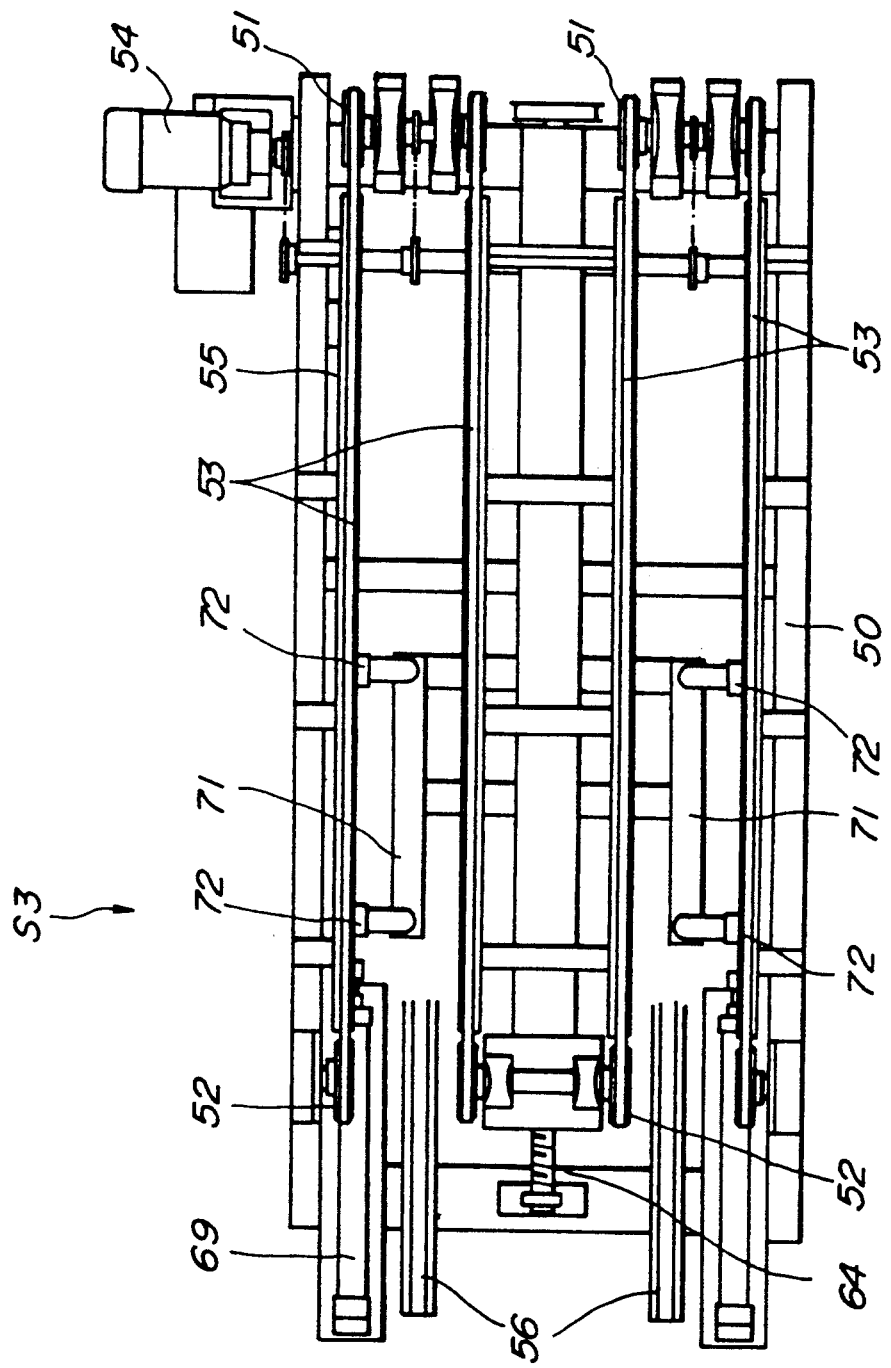
FIG. 7 is a plan view of the unloading station.

When the motor 63 is energized, the transfer device 60 moves back and forth toward and away from the pressing station S2 which is positioned on the lefthand side in FIG. 6. A cylinder unit 69 that is mounted on the support frame 10 serves as a safety device just like the cylinder unit 29 in the loading station S1.

A vertical cylinder unit 70 is mounted on a front portion (on the lefthand side in FIG. 3) of the second slider 66. The cylinder unit 70 supports on its rod a lifter 71 which supports a plurality of bearing rollers 72 on its upper end. When the cylinder unit 70 is contracted, the bearing rollers 72 are positioned beneath the conveyor belts 53. When the cylinder unit 70 is extended, the bearing rollers 72 are positioned above the conveyor belts 53.

The motor 63 is energized to move the transfer device 60 as a whole to a position near the pressing station S2. The glass sheets G which have temporarily been bonded in the pressing station S2 are transferred onto the bearing rollers 72 of the transfer device 60. The motor 63 is then reversed to move the transfer device 60 away from the pressing station S2 back to the position shown in FIG. 6. Thereafter, the cylinder unit 70 is contracted to lower the lifter 71, placing the glass sheets G onto the conveyor belts 53 which are then actuated to feed the glass sheets G to the next procession station.

Figure 8:
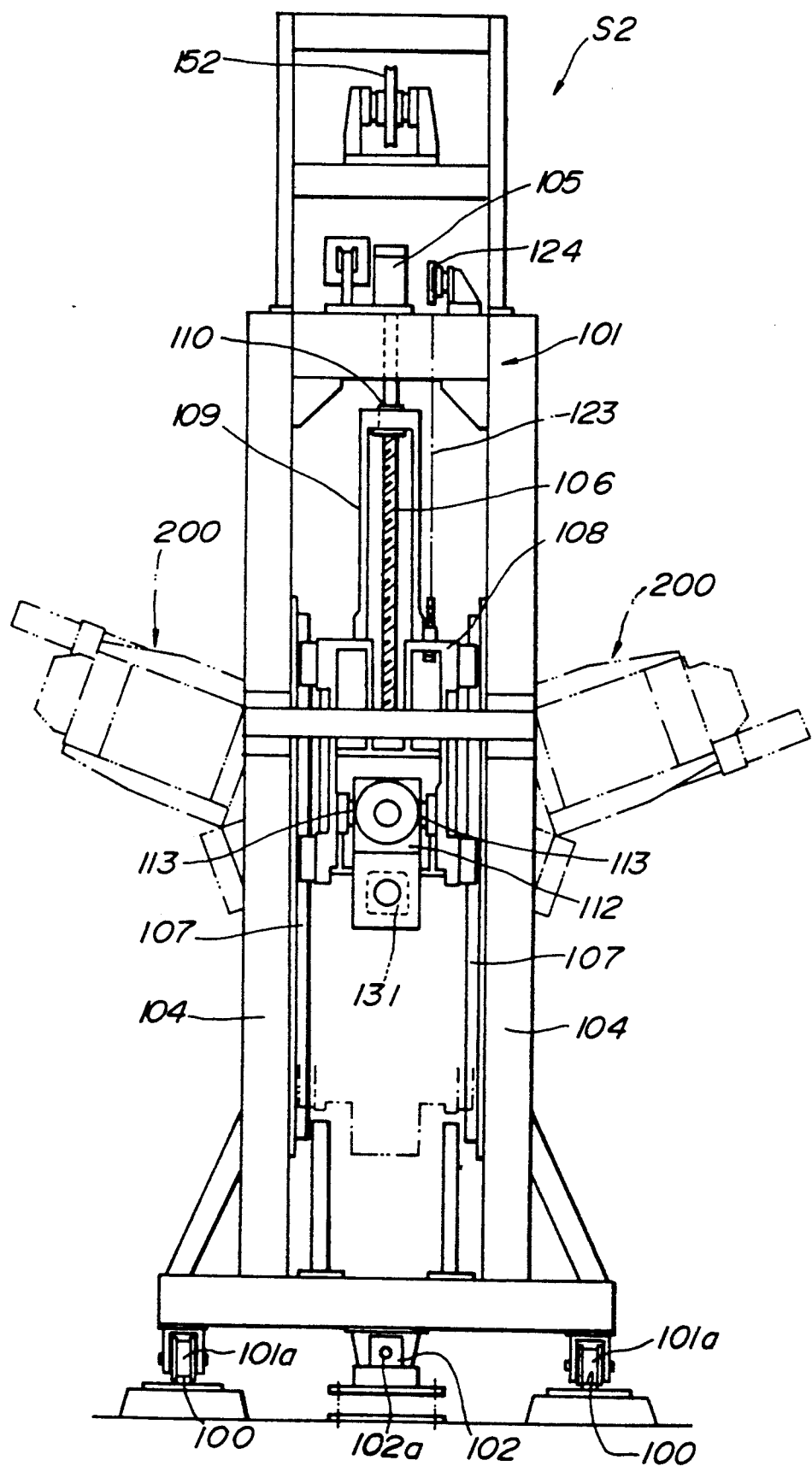
FIG. 8 is a front elevational view of a pressing station of the press roll apparatus.
Figure 9:
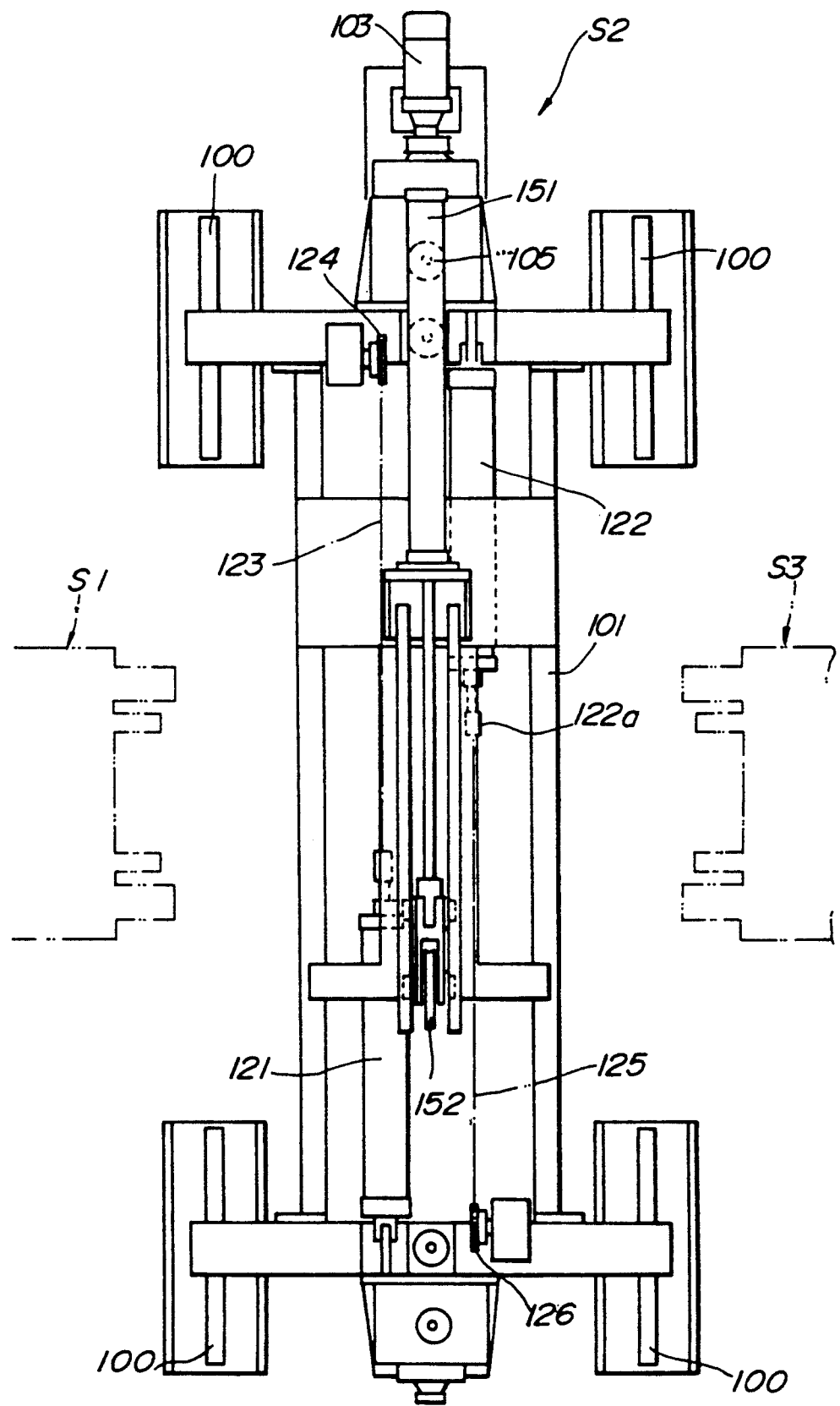
FIG. 9 is a plan view of the pressing station.

The pressing station S2 will be described below with reference to FIGS. 8 through 10.

The pressing station S2 comprises rails 100 mounted on a floor which extend perpendicularly to the direction in which the glass sheets G are fed from the loading station S1 to the unloading station S3. The pressing station S2 also has a support frame 101 movably supported on the rails 100 by rollers 101a. A nut 102 is mounted on the lower surface of the support frame 101 and threaded over a screw shaft 102a that is rotatable about its own axis by a motor 103. When the motor 103 is energized, the support frame 101 is moved in a direction normal to the direction in which the glass sheets G are fed.

The movable support frame 101 permits the pressing station S2 to process glass sheets of complex shape without increasing the number of drive roll units as described later on.

A frame 200 is vertically movably supported on the support frame 101. The frame 200 is also angularly movable as shown in FIG. 8, and swingable to the right or left as shown in FIG. 10. The frame 200 houses therein a plurality of roll units 300.

Mechanisms for vertically moving, angularly moving, and swinging the frame 200 will be described below with reference to FIGS. 11 through 17.

The support frame 101 comprises two pairs of vertical support columns 104. As shown in FIG. 11, a vertical screw shaft 106 which rotatable about its own axis by a motor 105 mounted on the support frame 101 is disposed between the support columns 104 in the lefthand pair (as viewed in FIG. 10). The support columns 104 have respective vertical rails 107 mounted on confronting inner surfaces thereof. A vertically movable member 108 slidably engages the rails 107 and is coupled through a joint 109 to a nut 110 which is threaded over the screw shaft 109.

Figure 13:
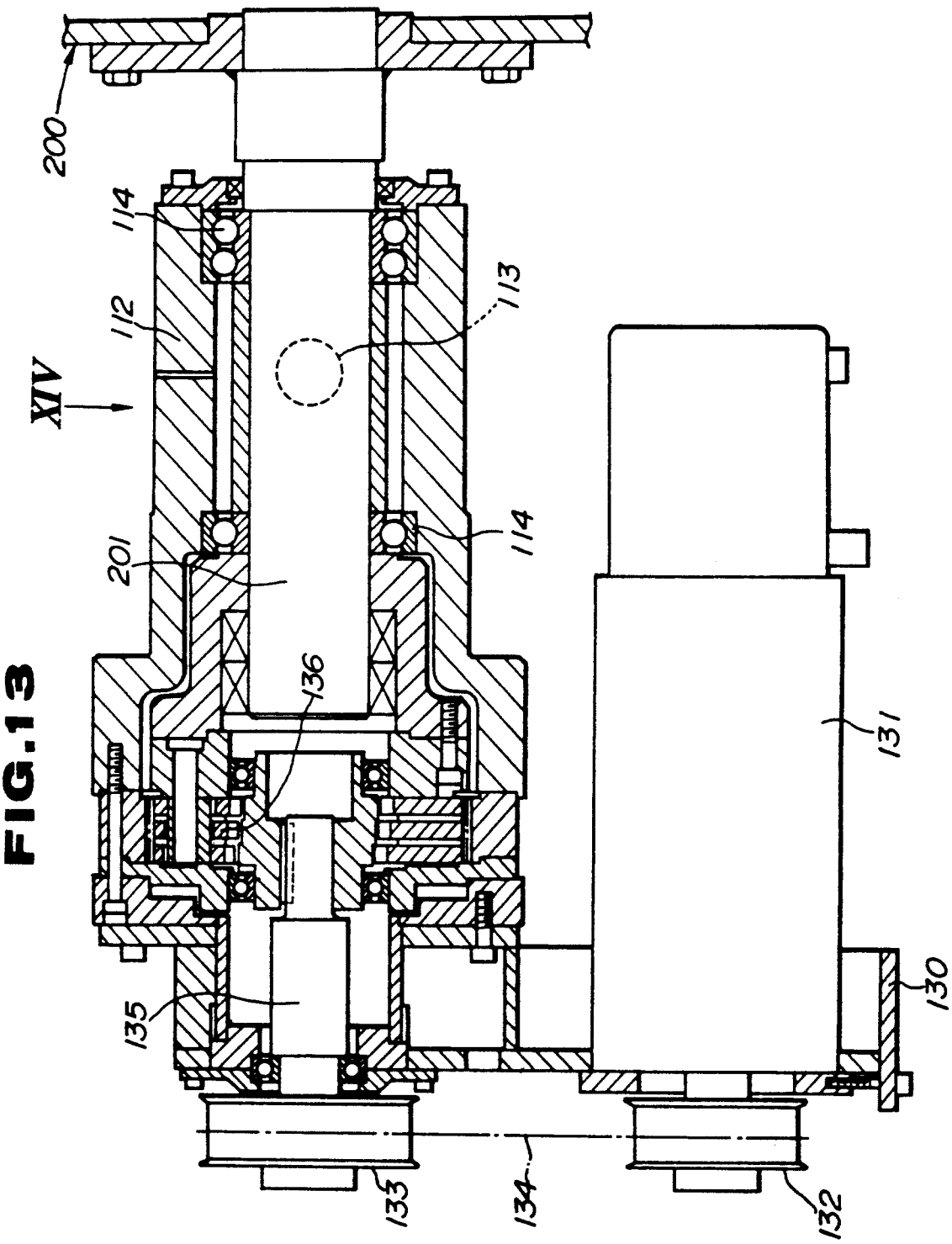
FIG. 13 is an enlarged fragmentary cross-sectional view of a portion of the pressing station shown in FIG. 10.
Figure 14:
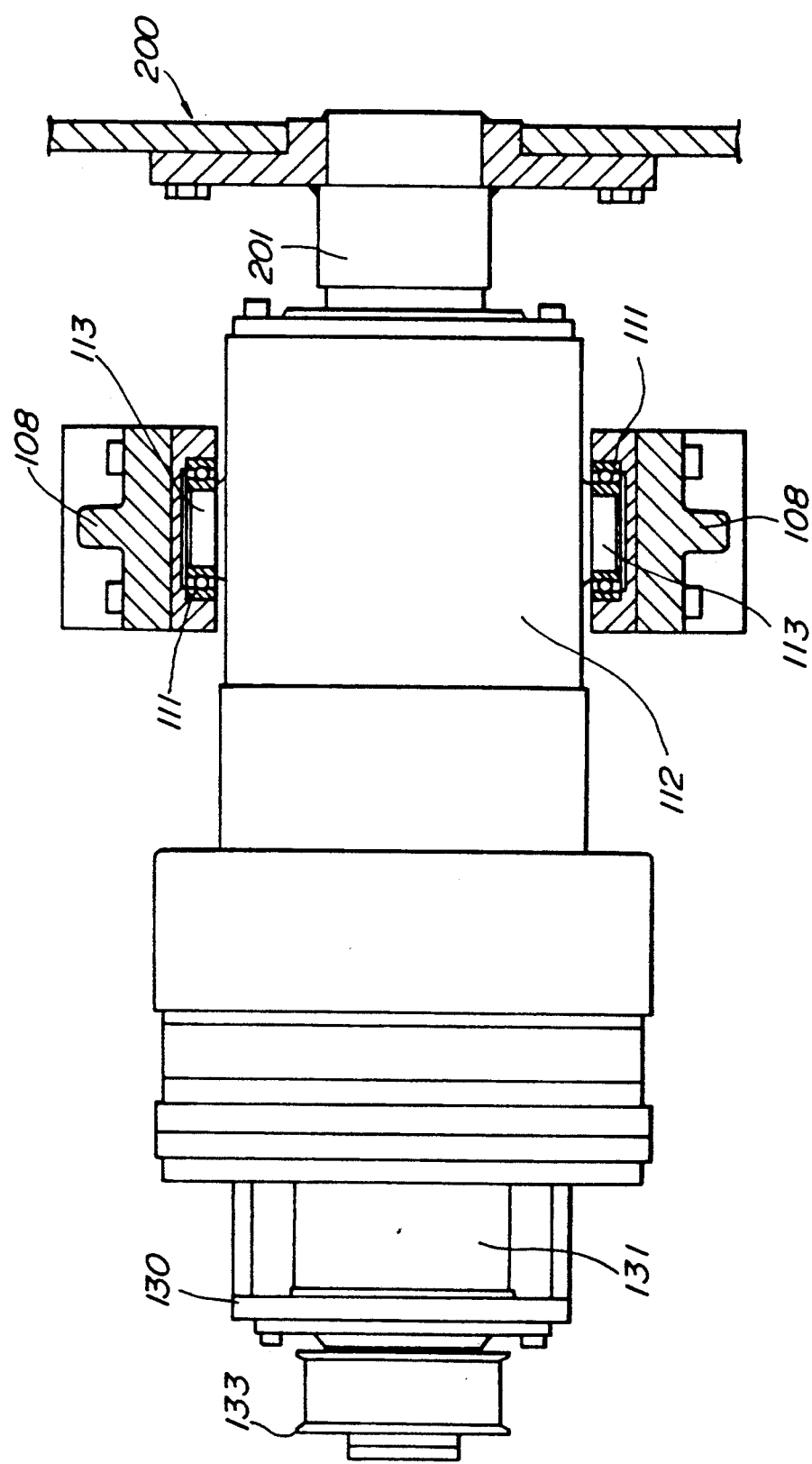
FIG. 14 is a view of the portion of the pressing station as viewed in the direction indicated by the arrow XIV in FIG. 13.

As shown in FIG. 14, bearings 111 are mounted on spaced confronting surfaces of the vertically movable member 108, and shafts 113 mounted on lateral sides of a tubular sleeve 112 are rotatably supported respectively in the bearings 111. As also shown in FIG. 13, a shaft 201 projecting from a left side wall of the frame 200 is rotatably mounted in the tubular sleeve 112 by bearings 114.

Figure 10:
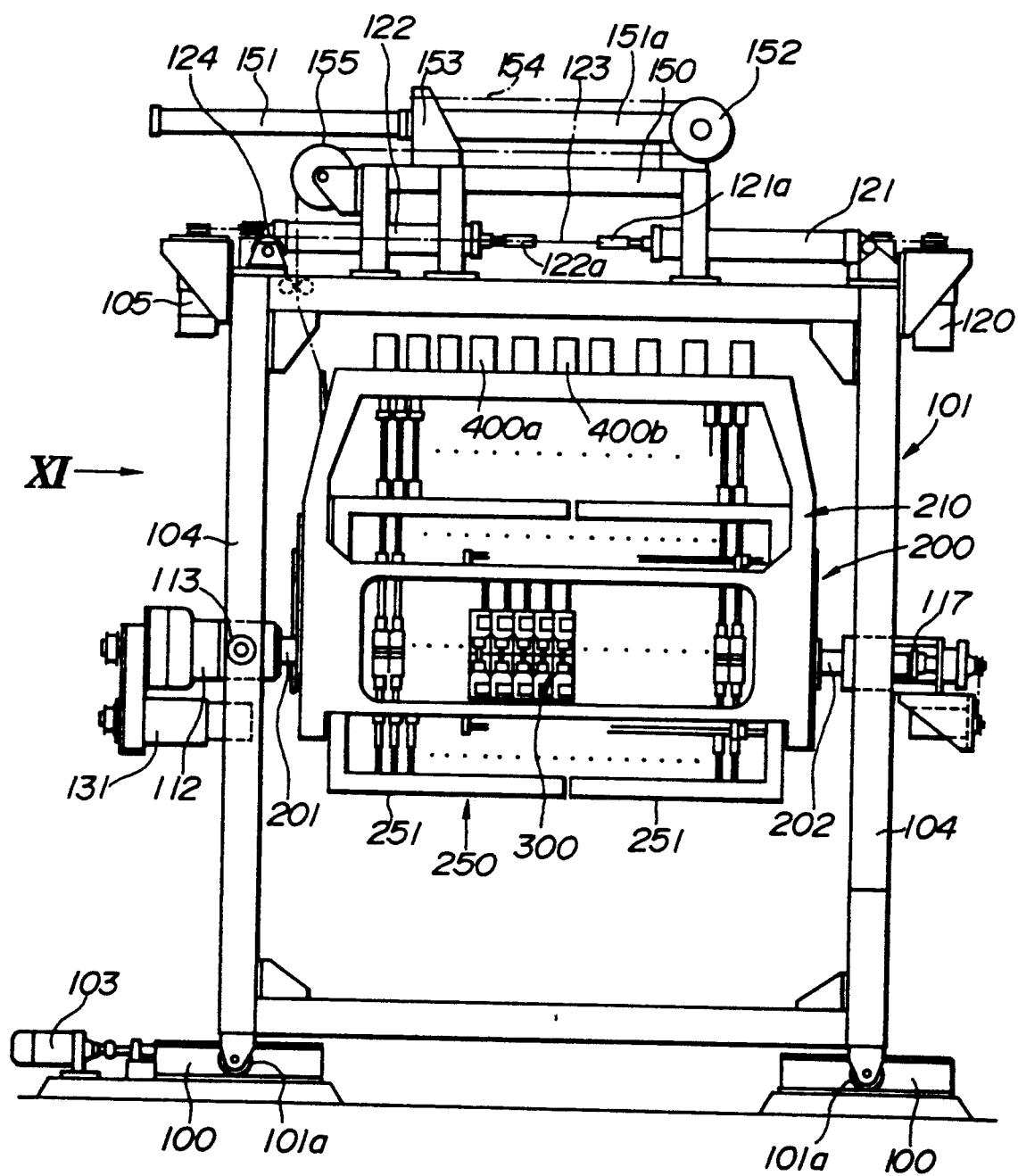
FIG. 10 is a side elevational view of the pressing station.
Figure 11:
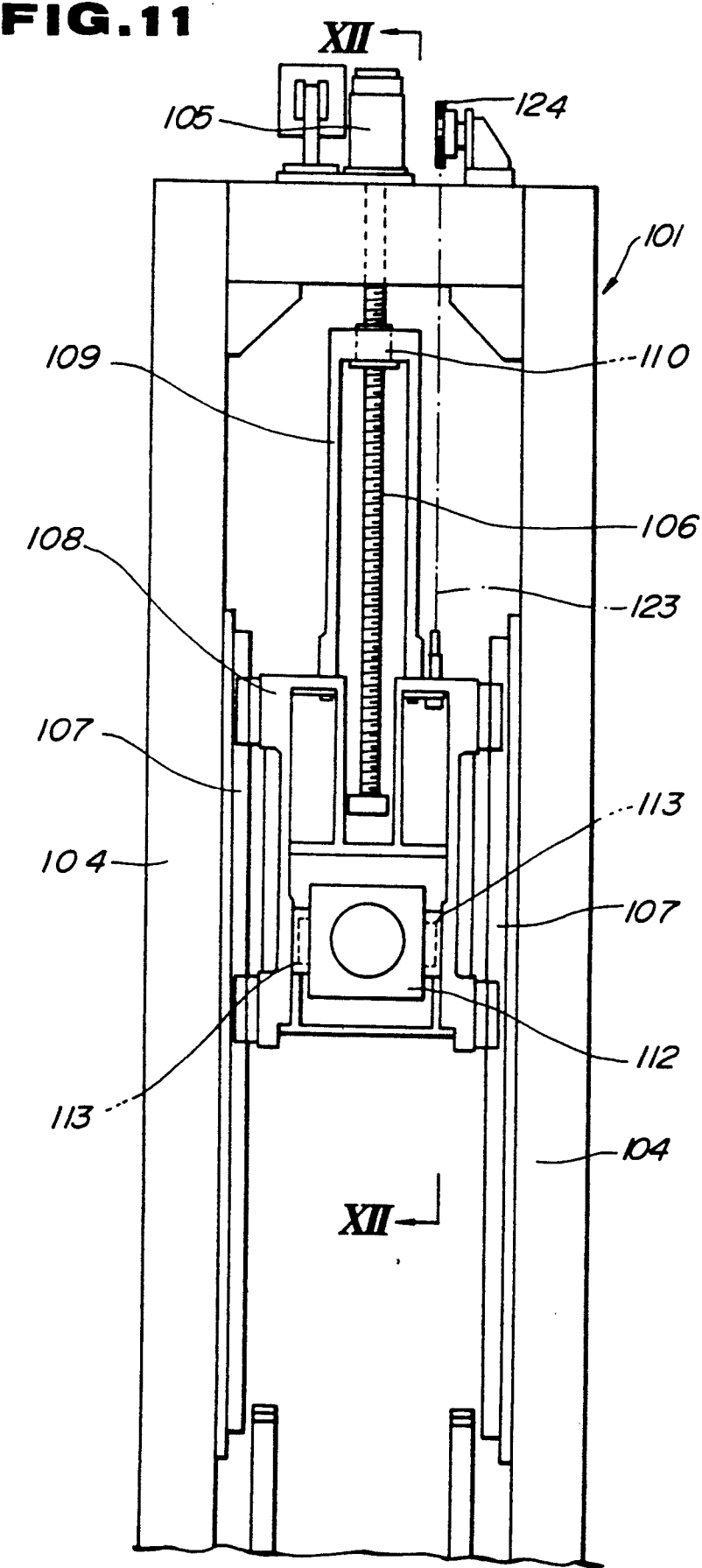
FIG. 11 is an enlarged view of the pressing station as viewed in the direction indicated by the arrow XI in FIG. 10.
Figure 16:
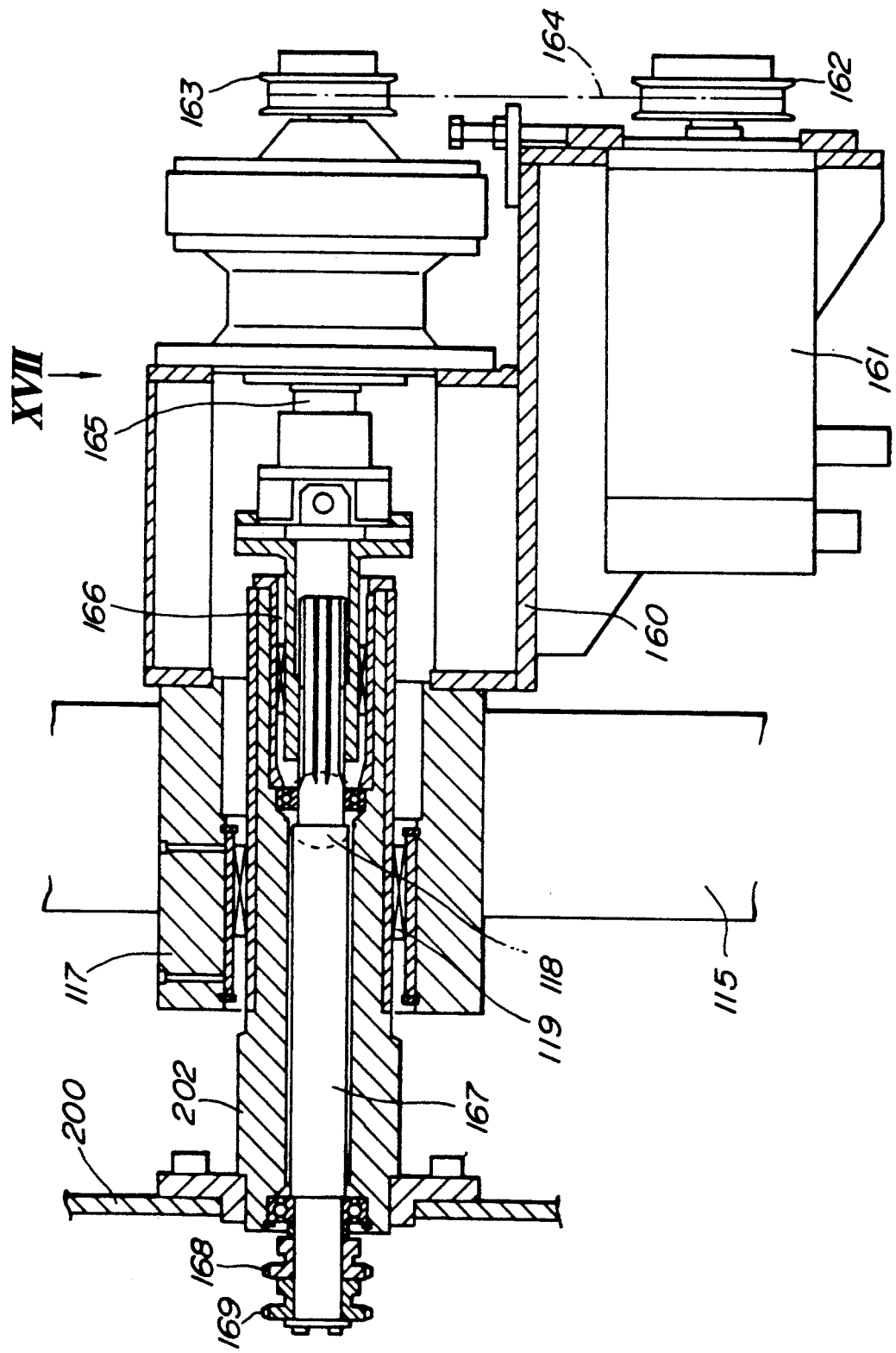
FIG. 16 is an enlarged fragmentary cross-sectional view of a portion of the pressing station shown in FIG. 10.

Similarly, a vertically movable member 115 (see FIG. 17) is positioned between the support columns 104 in the righthand pair (as viewed in FIG. 10). Bearings 116 are mounted on spaced confronting surfaces of the vertically movable member 115, and shafts 118 mounted on lateral sides of a tubular sleeve 117 are rotatably supported respectively in the bearings 116. As also shown in FIG. 16, a shaft 202 projecting from a right side wall of the frame 00 is rotatably mounted in the tubular sleeve 117 by a bearing 119.

The vertically movable member 115 is operatively coupled to a motor 120 (see FIG. 10) mounted on the support frame 200 through a screw shaft and a nut similar to those shown in FIG. 11. Therefore, the vertically movable member 115 vertically moves when the motor 120 is energized.

Consequently, the frame 200 coupled to the vertically movable members 108, 115 vertically moves when the motors 105, 120 are energized. The frame 200 is so heavy that it might possibly impose undue loads on the motors 105, 120. To prevent the motors 105, 120 from being overloaded by the frame 200, the frame 200 is additionally supported as follows: Air cylinder units 121, 122 are mounted on the upper end of the support frame 200. The air cylinder unit 121 has a rod whose distal end 121a is connected to one end of a chain 123 which is trained around a pulley 24, the other end of the chain 123 being connected to the vertically movable member 108, as shown in FIGS. 8 through 11. Likewise, the air cylinder unit 122 has a rod whose distal end 122a is connected to one end of a chain 125 (see FIG. 9) which is trained around a pulley 126, the other end of the chain 125 being connected to the vertically movable member 117. The air cylinder units 121, 122 serve to support the heavy frame 200 against gravity such that the load on the motors 105, 120 is reduced when they move the heavy frame 200 vertically.

Figure 15:
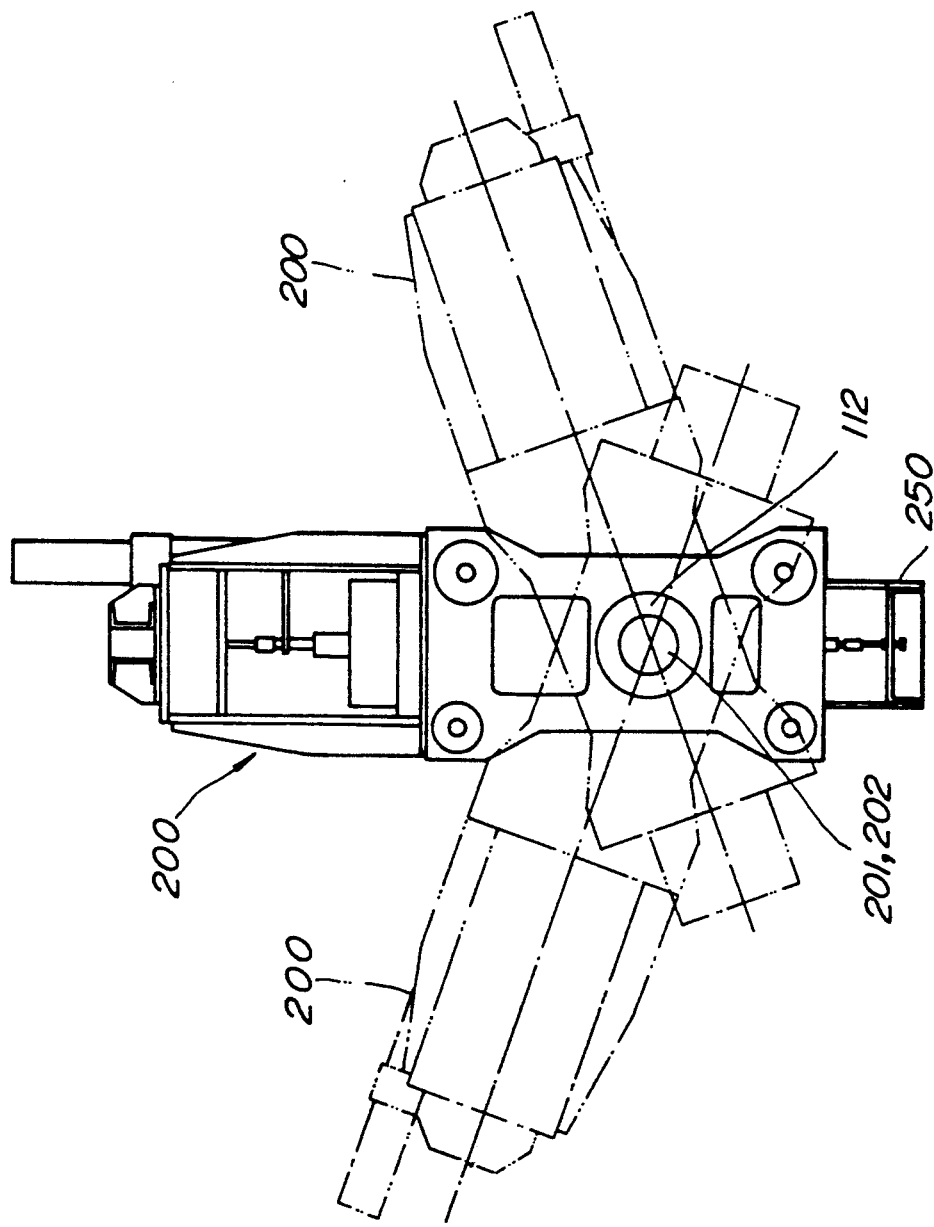
FIG. 15 is a view showing the manner in which a frame moves.

As shown in FIG. 13, a motor 131 is attached to an outer end of the tubular sleeve 112 by a bracket 130. Drive power produced by the motor 131 is transmitted through pulleys 132, 133 and a belt 134 trained therearound to a drive shaft 135 that is coupled to the shaft 201 through a power transmitting mechanism 136. When the motor 131 is energized, therefore, the frame 200 angularly moves about the shafts 201, 202 through a predetermined angle as shown in FIG. 15.

To reduce loads acting on the motor 131 at the time it angularly moves the frame 200, the frame 200 is additionally supported as follows: As shown in FIG. 10, a support base 150 is mounted on the upper end of the support frame 101, and an air cylinder 151 is mounted on the support base 150. The air cylinder unit 151 has a rod 151a with a pulley 152 mounted on its distal end. A piano wire 154 which is trained around the pulley 152 has one end fixed to a bracket 153 joined to the air cylinder unit 151. The piano wire 154 is also trained around a guide pulley 52 supported on the support base 150, and has its opposite end affixed to the frame 200.

As illustrated in FIG. 16, the shaft 202 is axially slidably supported in the tubular sleeve 117 by the bearing 119 so that the shaft 102 can move to the left or right.

Figure 12:
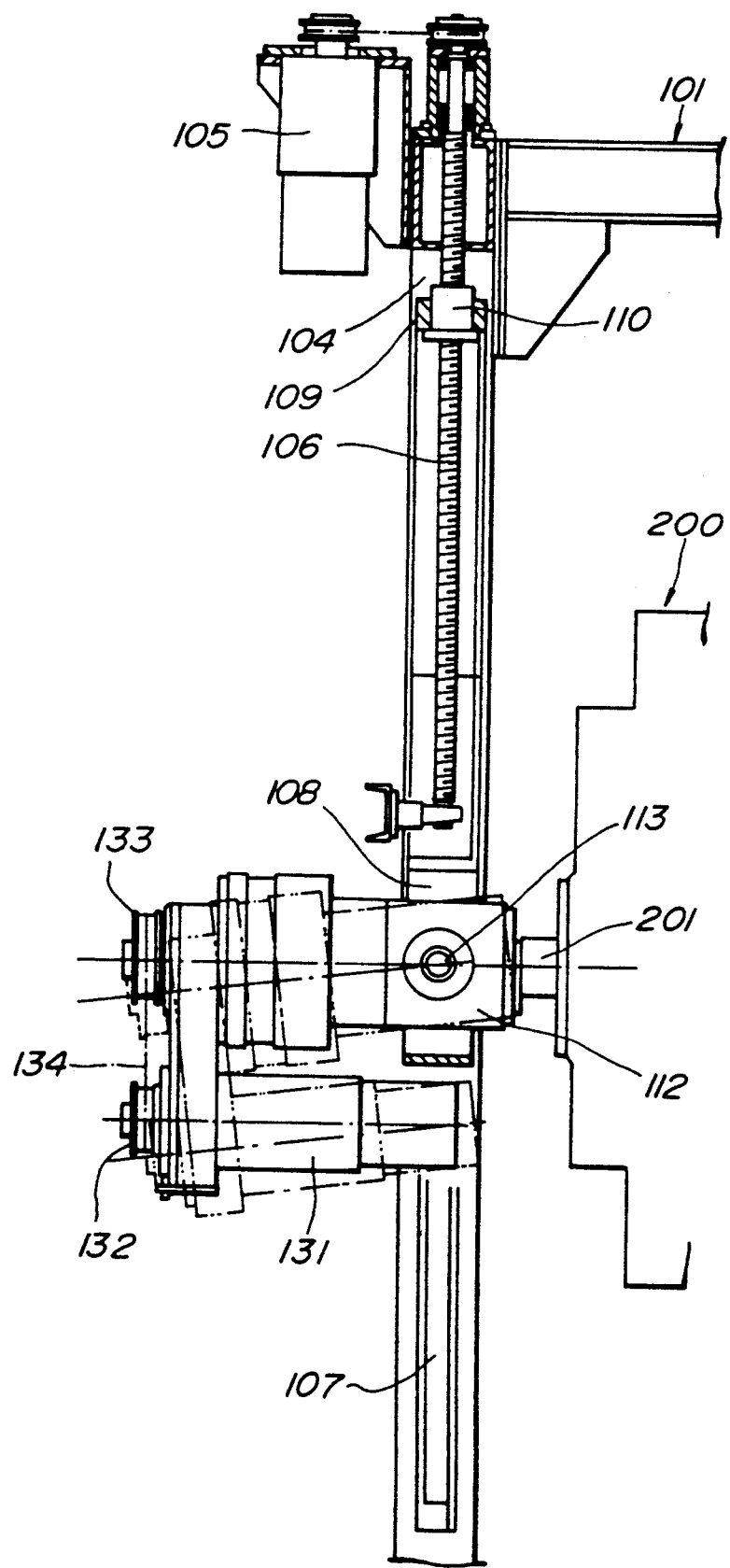
FIG. 12 is a cross-sectional view taken along line XII—XII of FIG. 11.

Since the vertically movable members 108, 115 are independently movable vertically by the respective motors 105, 120, the frame 200 is swingable to the left or right as indicated by the imaginary lines in FIG. 12 (which represent vertical angular displacement of the tubular sleeve 112 and the motor 131) when the vertically movable members 108, 115 are vertically moved to different vertical positions. The imaginary lines in FIG. 12 indicate that the vertically movable member 115 is moved higher than the vertically movable member 108. When the frame 200 is thus swung, the shaft 202 axially moves with respect to the tubular sleeve 117.

Figure 17:
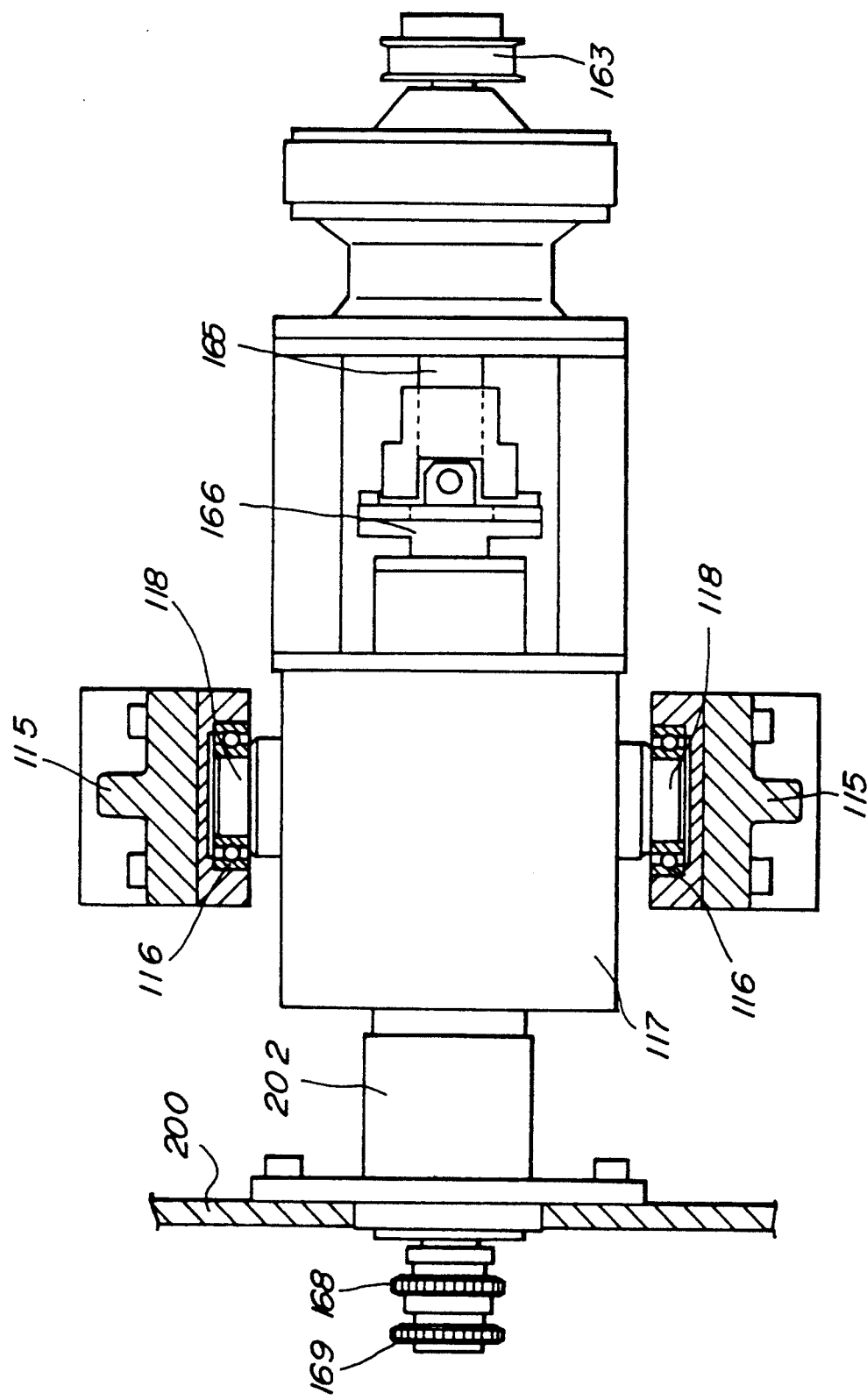
FIG. 17 is a view of the portion of the pressing station as viewed in the direction indicated by the arrow XVII in FIG. 16.
Figure 18:
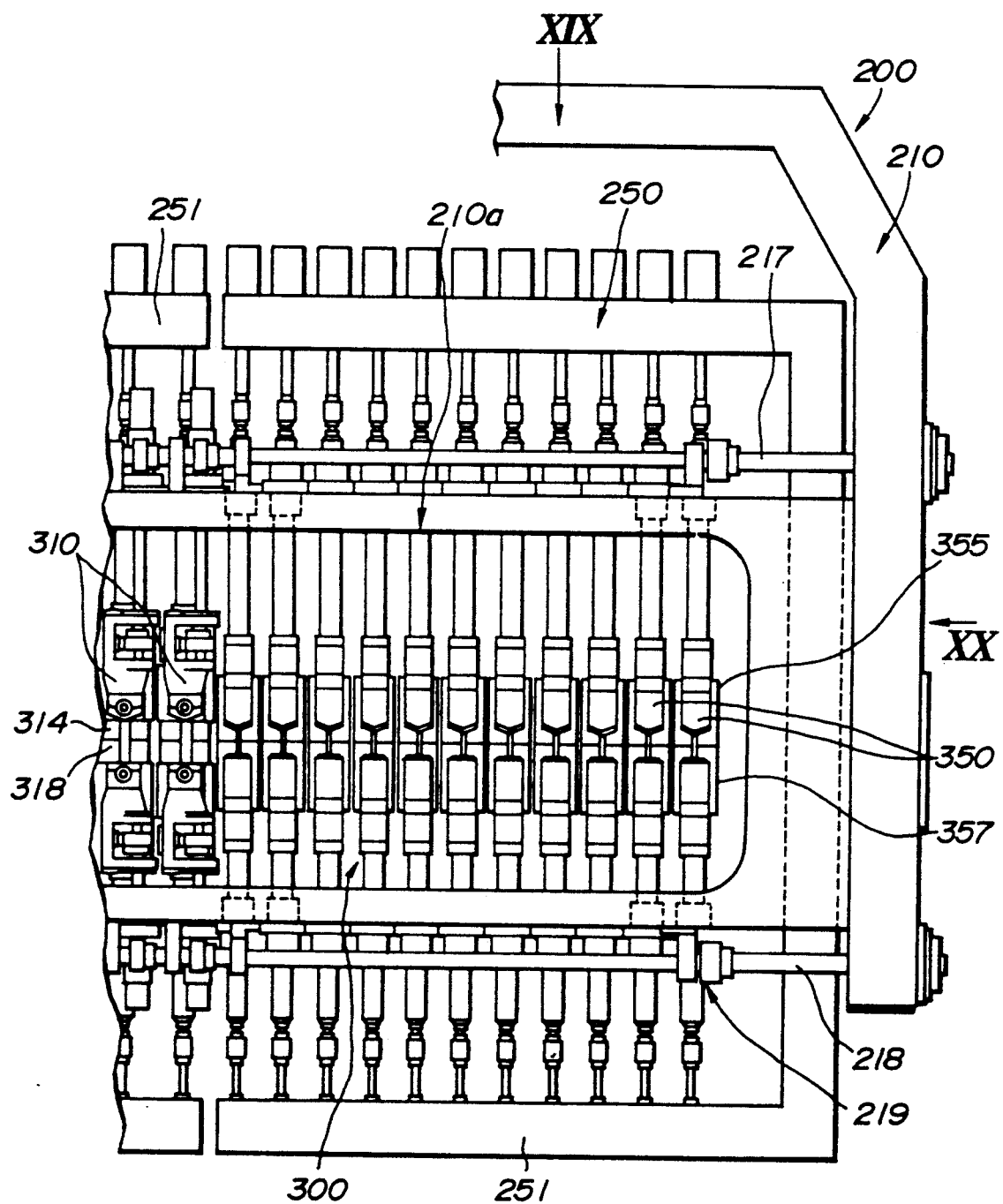
FIG. 18 is an enlarged fragmentary view of roll units.

As shown in FIGS. 16 and 17, a motor 161 is attached to a side of the tubular sleeve 117 by a bracket 160. Drive power produced by the motor 161 is transmitted to a shaft 165 through a pulley 162 coupled to the motor 161, a pulley 163 coupled to the shaft 165. The drive power is then transmitted from the shaft 165 to a drive shaft 167 rotatably held in the tubular sleeve 117 through a joint 166. The drive shaft 167 and the joint 166 are splined to each other to allow the drive power to be transmitted from the joint 166 to the drive shaft 167 even when the shaft 202 axially moves upon swinging movement of the frame 200.

Gears 168, 169 are fitted over an inner end of the drive shaft 167 for transmitting the drive power from the drive shaft 167 to upper and lower presser rolls of drive roll units as described later on.

The frame 200 and the roll units 300 will be described below with reference to FIGS. 10 and 18 through 20.

The frame 200 comprises a main frame 210 and a subframe 250. The main frame 210 is substantially in the form of a cage with the shafts 201, 202 projecting laterally from opposite sides of the main frame 210. The shaft 202 is shown in FIG. 20.

Figure 20:
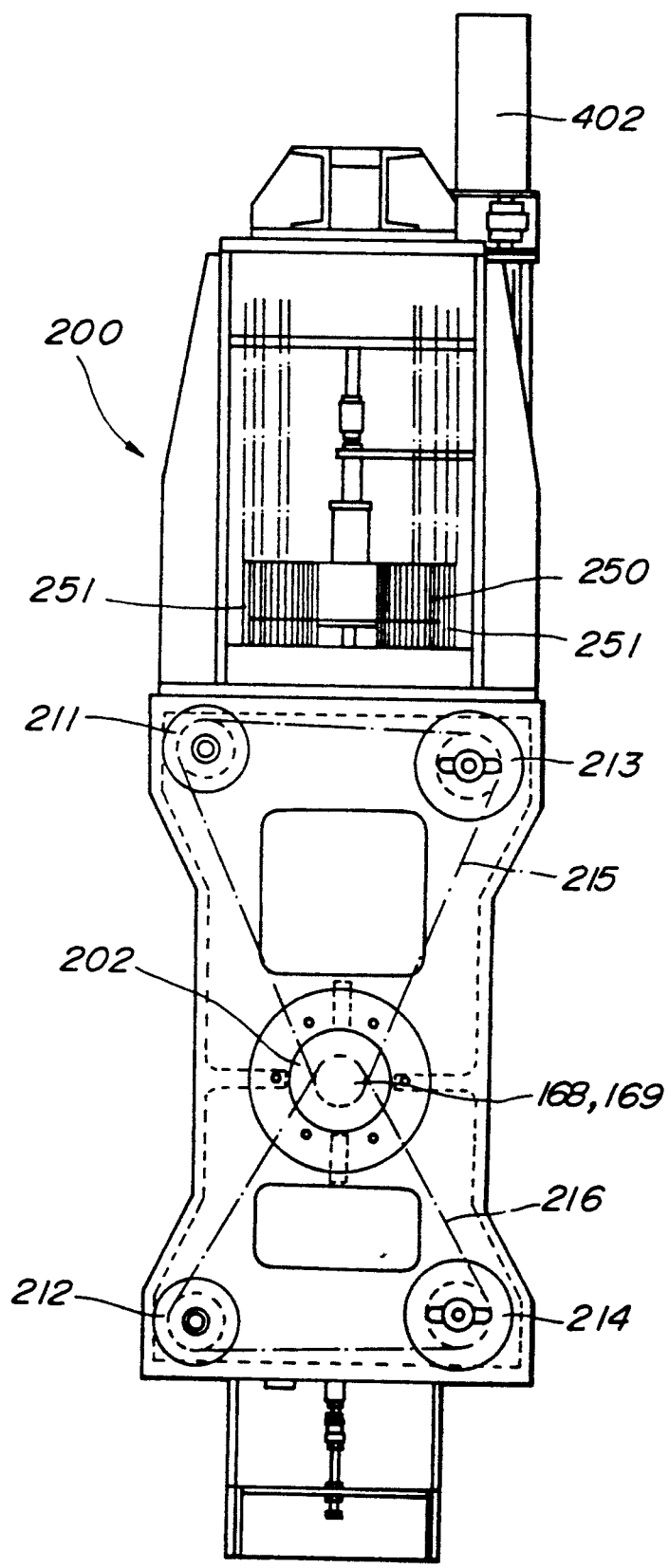
FIG. 20 is a view of the roll units as viewed in the direction indicated by the arrow XX in FIG. 18.
Figure 21:
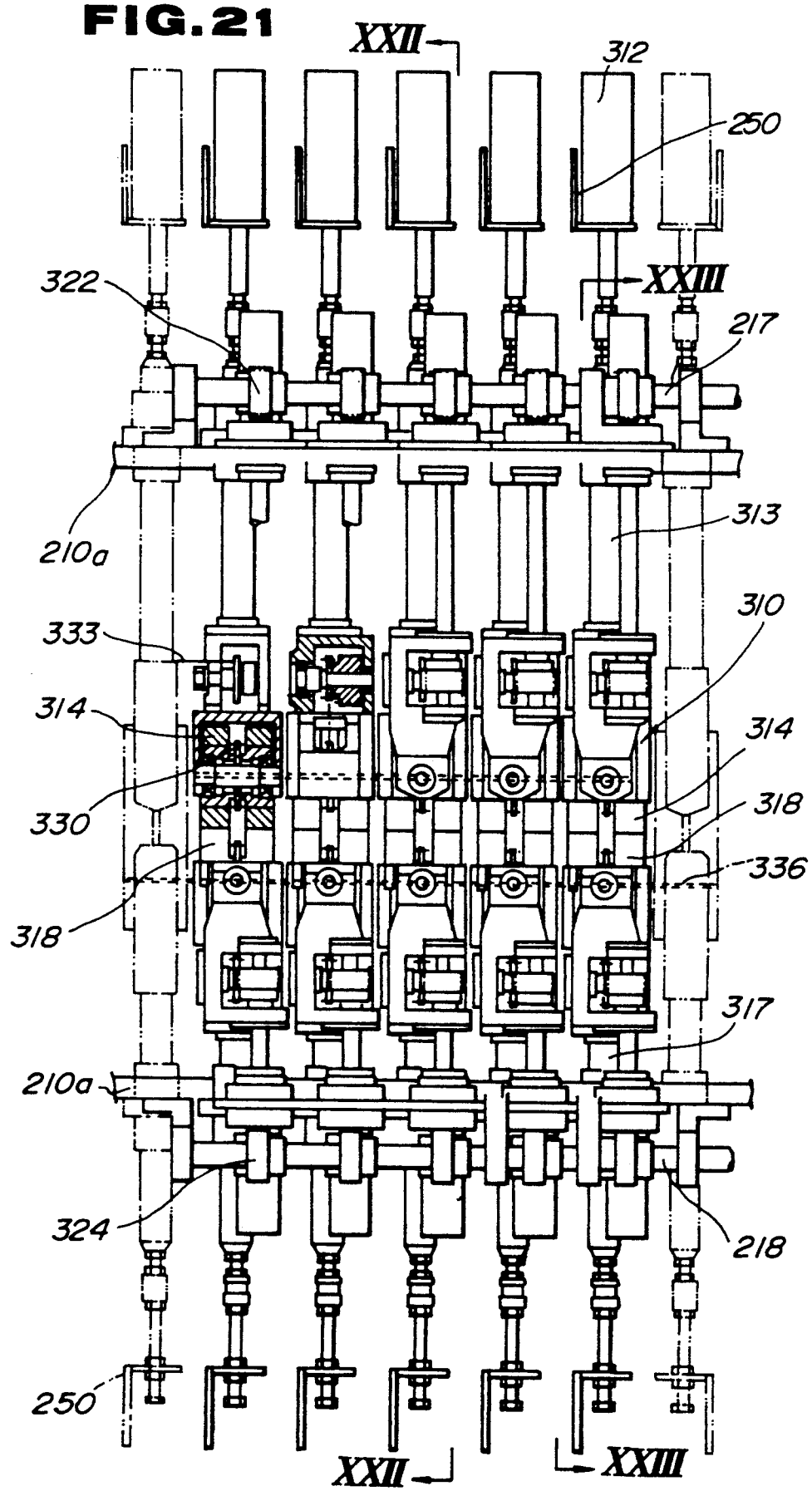
FIG. 21 is an enlarged fragmentary view of drive roll units.

As shown in FIG. 20, gears 211, 212 and tensioners 213, 214 are mounted on respective four corners of the side of the main frame 210 from which the shaft 202 projects. A chain 215 is trained around the gear 168, the gear 211, and the tensioner 213, and a chain 216 is trained around the gear 169, the gear 212, and the tensioner 214. The gear 211 is coaxially coupled to an upper drive shaft 217 (see FIG. 18), so that the upper drive shaft 217 is rotatable about its own axis by the motor 161. Similarly, the gear 212 is coaxially coupled to a lower drive shaft 218, so that the lower drive shaft 218 is rotatable about its own axis by the motor 161.

The lower drive shaft 218 is coupled to an overrunning mechanism 219 (see FIG. 18) for increasing the rotational speed of lower presser rolls held against a curved outer surface of the glass sheets G to compensate for a dimensional difference between curved outer and inner surfaces of the glass sheets G, thereby preventing slippage of the the presser rolls against the glass sheets G.

The subframe 250 comprises a plurality of subframe elements associated respectively with the roll units 300. Each of the subframe elements has a pair of frame members 251 which is channel-shaped as viewed in front elevation in FIG. 10 and also in plan in FIG. 19, the frame members 251 having upper ends coupled by plates 252 (see FIG. 22) and lower ends coupled by plates 252. The roll units 300 housed in the frame 200 are supported between the upper plates 252 and the lower plates 252.

Figure 19:
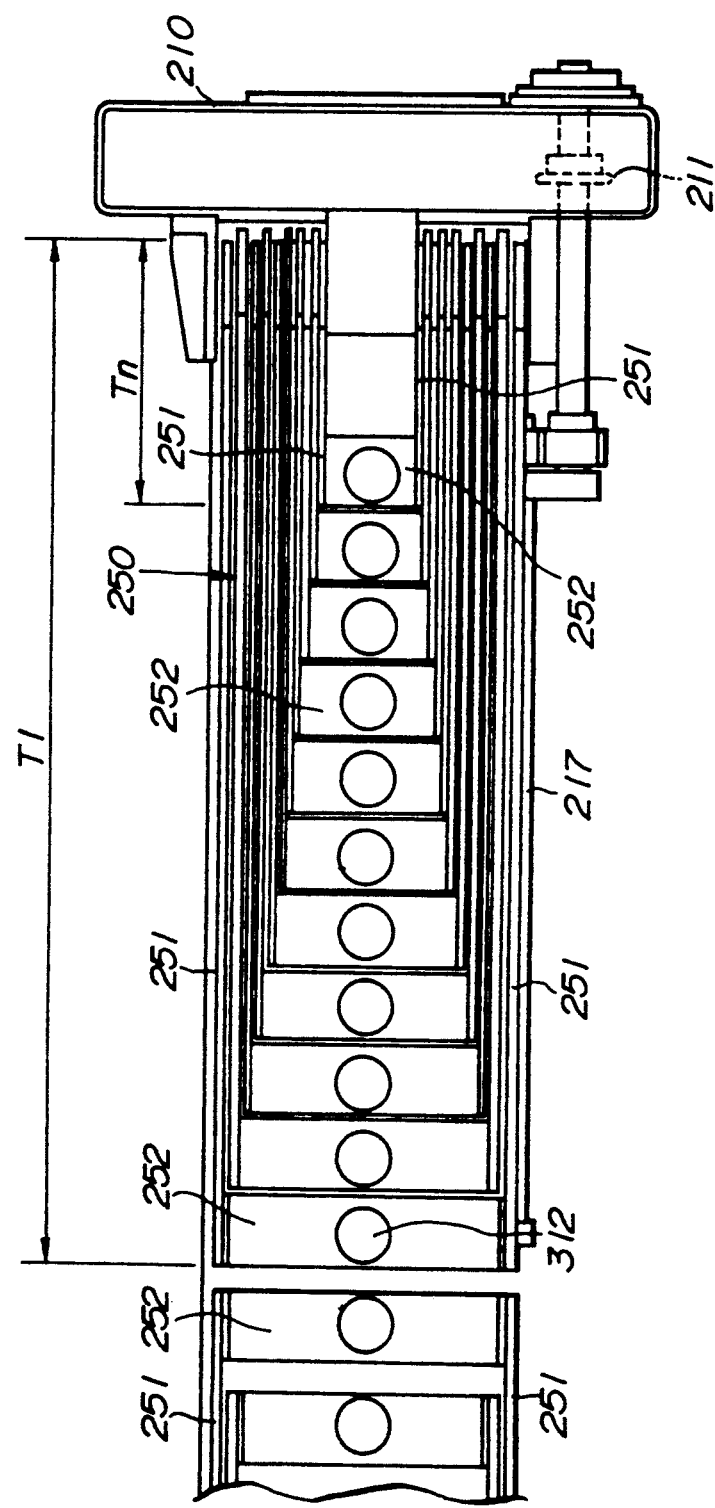
FIG. 19 is a view of the roll units as viewed in the direction indicated by the arrow XIX in FIG. 18.

The subframe 250 is suspended by the main frame 10 for vertical movement with respect to the main frame 10. The subframe 250 is of a horizontally symmetrical shape as shown in FIG. 10 As shown in FIG. 19, the subframe elements are of successively varying horizontal lengths such that the frame members 251 supporting centrally located roll units have a largest horizontal length T1 and the frame members 251 supporting terminal roll units at the horizontal ends of the subframe 250 have a smallest horizontal length Tn.

The roll units 300 include a plurality of drive roll units 310 and a plurality of free roll units 350.

First, the drive roll units 310 will be described below with reference to FIGS. 21 through 26.

Figure 22:
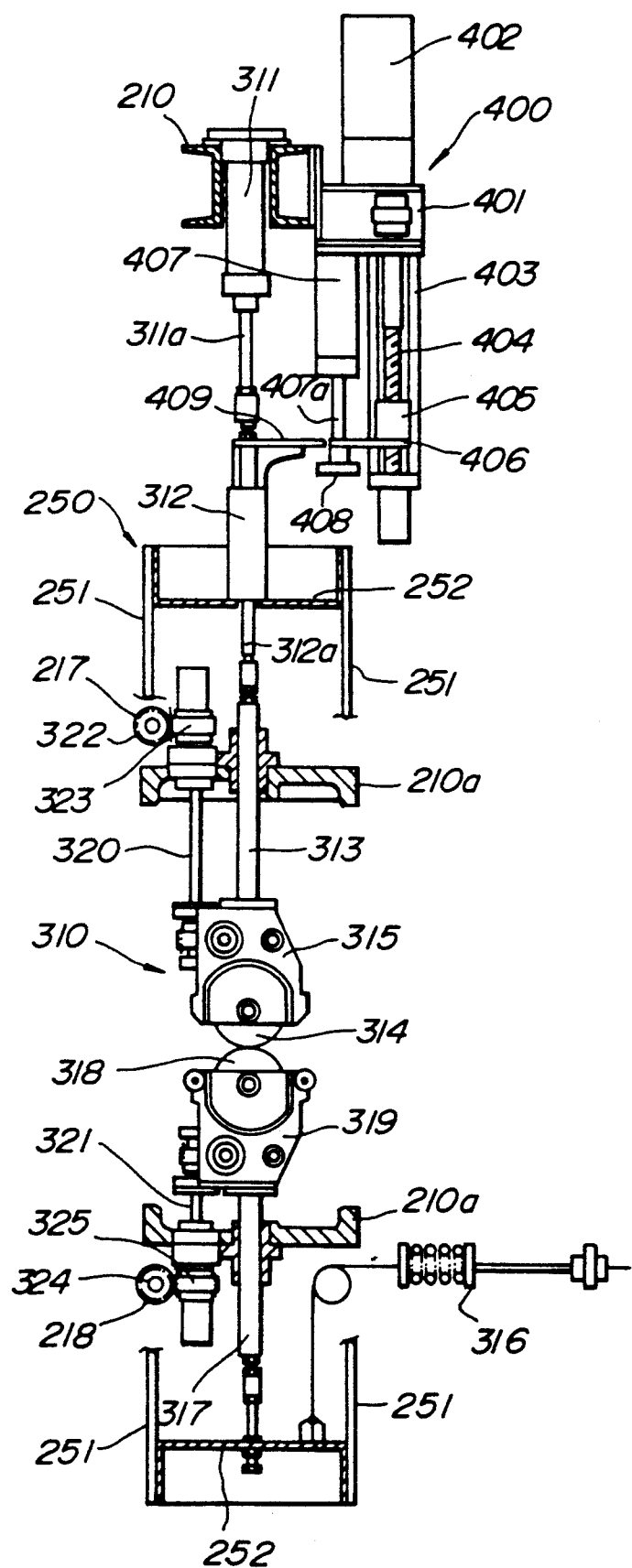
FIG. 22 is a cross-sectional view taken along line XXII—XXII of FIG. 21.

As shown in FIG. 22, each of the drive roll units 310 is combined with a balancing cylinder 311. The balancing cylinder 311 has a rod 311a whose lower end is coupled to the upper end of a cylinder unit 312 fixedly mounted on the upper plate 252 of the subframe element. The cylinder unit 312 has a rod 312a with its lower end coupled to the upper end of a rod 313 that extends through an upper inner frame member 210a of the main frame 210. The rod 313 has a lower end joined to a gearbox 315 which supports an upper presser roll 314 of one of the drive roll units 310.

The lower plate 252 of the subframe element is connected to a balancing spring 316 which normally urges the lower plate 252 upwardly, thus making up for any shortage of the power of the balancing cylinder 313. To the lower plate 252, there is positionally adjustably connected the lower end of a rod 317 that extends through a lower inner frame 210a of the main frame 210. The upper end of the rod 317 is connected to a gearbox 319 which supports a lower presser roll 318 of the drive roll unit 310.

Figure 24:
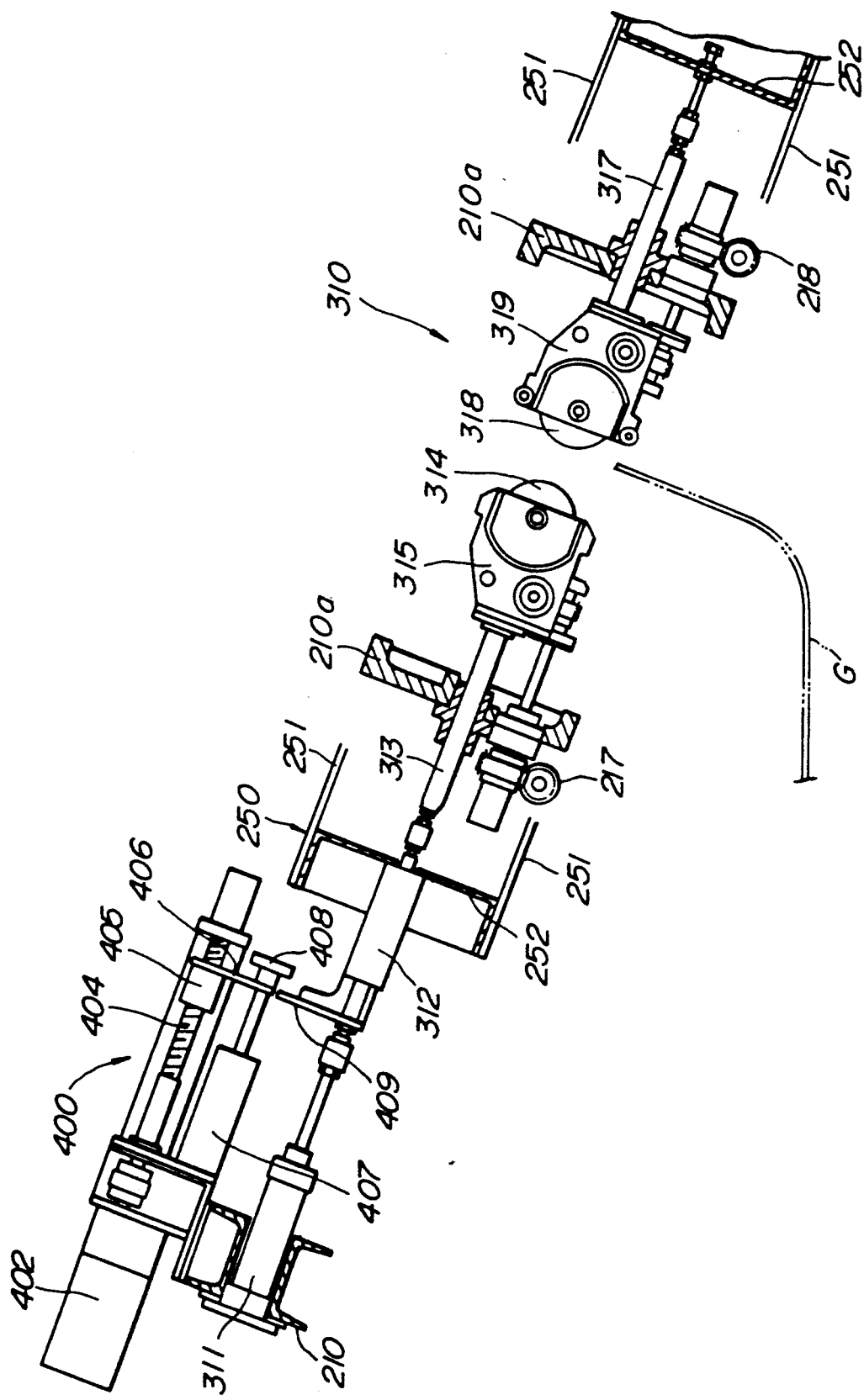
FIG. 24 is a view showing the manner in which the drive roll units move.

When the cylinder unit 312 is actuated, the rod 313 is pulled up as shown in FIG. 24, moving the upper presser roll 314 away from the lower presser roll 318 to allow the leading end of glass sheets G to enter easily between the upper and lower presser rollers 314, 318.

Figure 23:
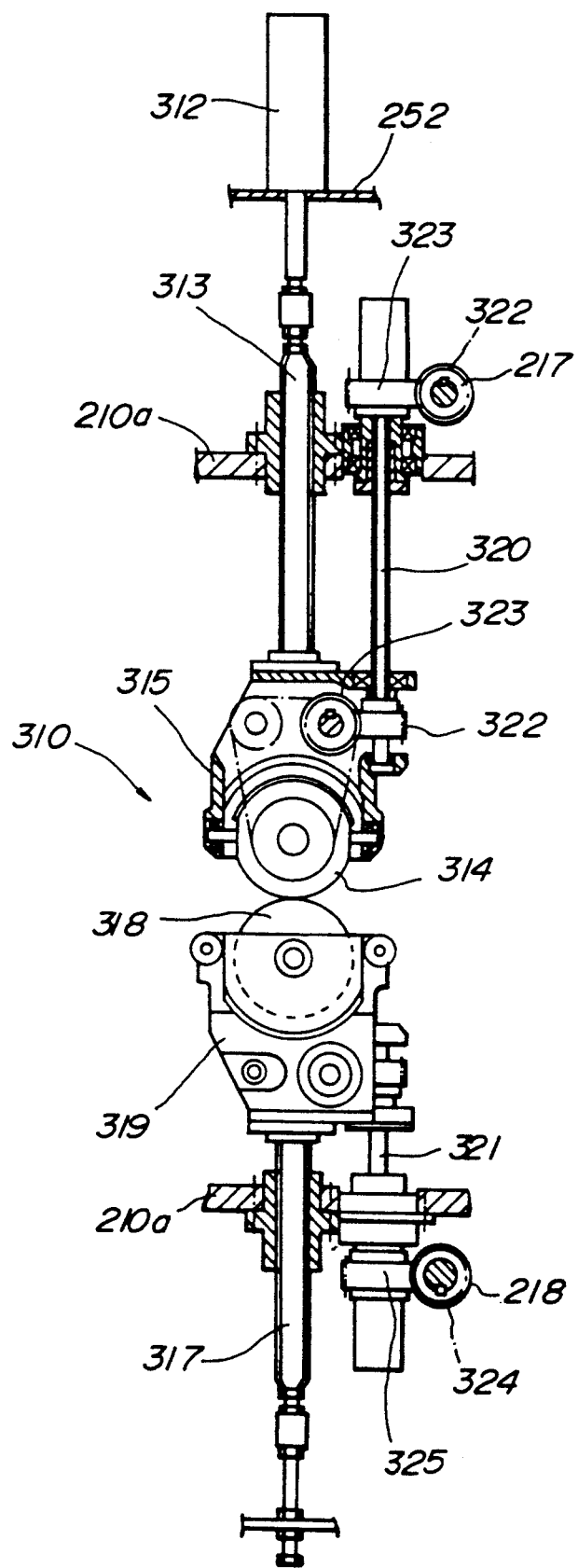
FIG. 23 is a cross-sectional view taken along line XXIII—XXIII of FIG. 21.

As shown in FIG. 23, shafts 320, 321 for transmitting drive power to the upper and lower presser rolls 314, 318 are rotatably supported respectively on the upper and lower inner frames 210a of the main frame 210.

As shown in FIGS. 22, 23, 25 and 26, the rotative drive power from the upper drive shaft 217 is transmitted to the shafts 320 through intermeshing gears 322, 323. As shown in FIGS. 22 and 23, the rotative drive power from the lower drive shaft 218 is transmitted to the shafts 321 through intermeshing gears 324, 325.

Figure 25:
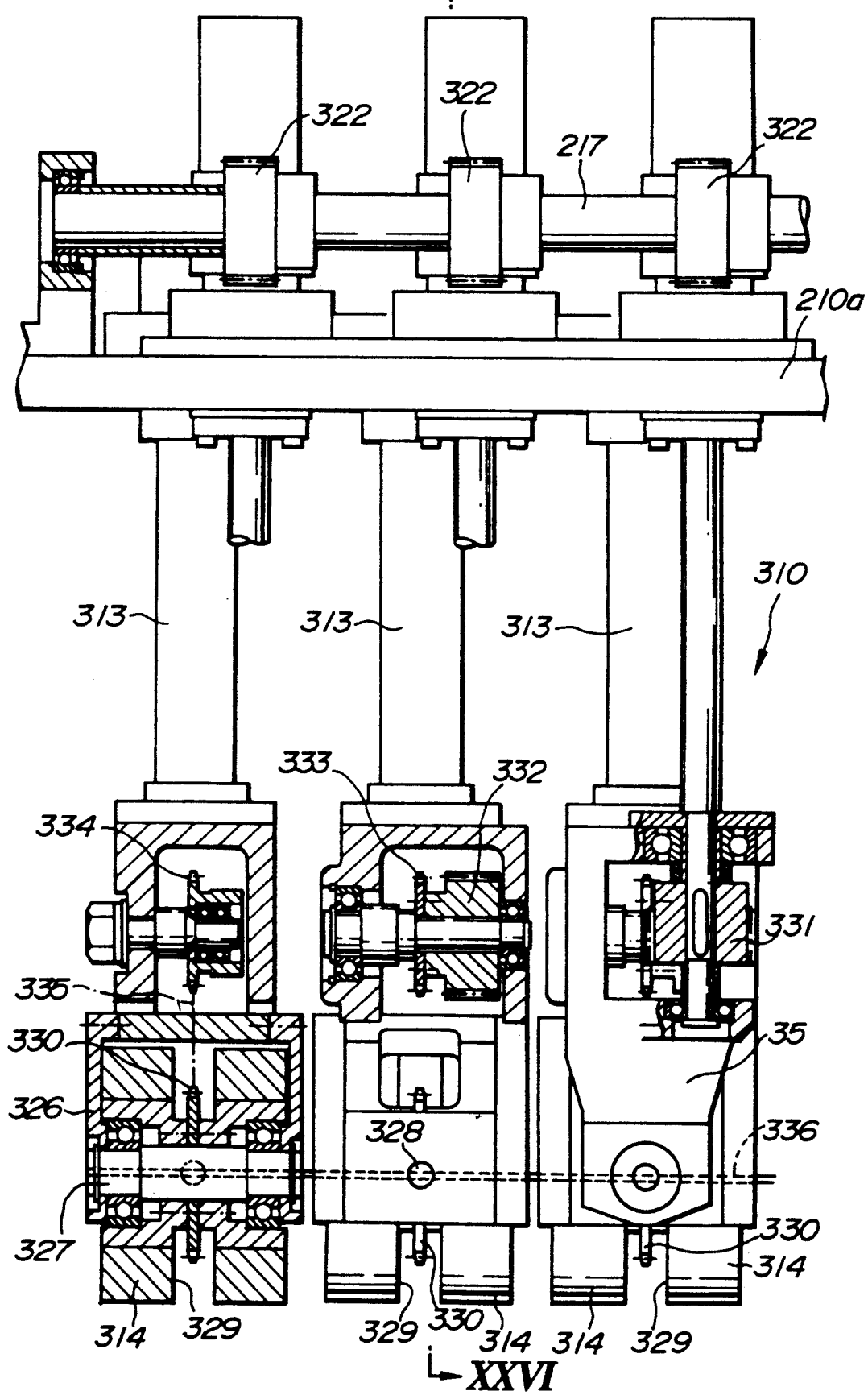
FIG. 25 is an enlarged fragmentary view of presser rolls of the drive roll units.

As shown in FIG. 25, each of the upper presser rolls 314 is rotatably supported on a shaft 327 mounted in a case 326 which is supported on the gearbox 315 by pins 328 (see FIG. 26) for angular movement about the pins 328.

Figure 26:
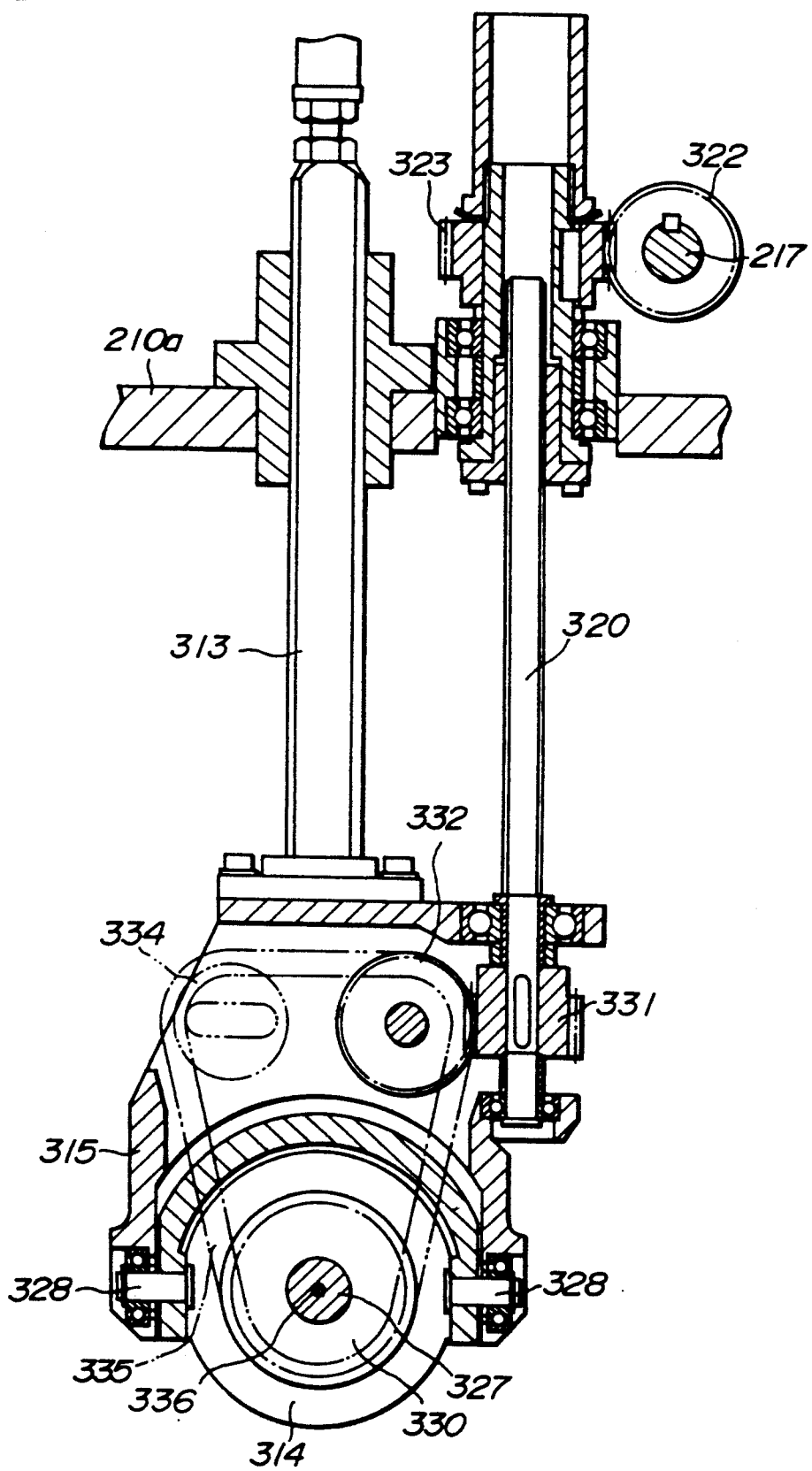
FIG. 26 is a cross-sectional view taken along line XXVI—XXVI of FIG. 25.

Each of the upper presser rolls 314 has an axially central groove 329 defined therein which provides a small-diameter portion with a driven sprocket 330 being fixed thereto in the groove 329. The driven sprocket 330 is smaller in diameter than the upper presser roll 314. As shown in FIGS. 25 and 26, a gear 331 fixedly mounted on the lower end of the shaft 320 is held in mesh with a gear 332 rotatably supported in the gearbox 315. A drive sprocket 333 is attached for rotation in unison with the gear 332. A tensioner 334 is rotatably mounted in the gearbox 315. A chain 335 is trained around the drive sprocket 333, the tensioner 334, and the driven sprocket 330. Therefore, the upper presser roll 314 can be rotated by the drive power transmitted from the upper drive shaft 317.

The lower presser roll 318 and its associated power transmitting mechanism are of a structure similar to the upper presser roll 314 and its associated power transmitting mechanism described above.

As shown in FIGS. 25 and 26, the drive sprocket 333 and the driven sprocket 330 are positioned within a plane containing the pins 328. Thus, the chain 335 is prevented from disengaging from the driven sprocket 330 when the upper and lower presser rolls 314, 318 swing about the pins 328 because of the shape of the glass sheets G contacted by the upper and lower presser rolls 314, 318.

If, however, the upper and lower presser rolls 314, 318 were freely swingable about the pins 328, then the glass sheets G would not smoothly enter the upper and lower presser rolls 314, 318. In view of this, adjacent ones of the presser rolls 314, 318 are prevented from freely swinging with respect to each other by a piano wire 336 extending through holes defined in the shafts 327 of the drive roll units 310.

As shown in FIGS. 22 and 24, each group of roll units 300 is associated with a height setting mechanism 400. The height setting mechanism 400 will be described below with reference to FIG. 22.

The height setting mechanism 400 comprises a rotary actuator 402 mounted on the main frame 210 by a bracket 401, and a guide rod 403 extending downwardly from the bracket 401. A screw shaft 404 rotatable about its own axis by the rotary actuator 402 is disposed parallel to the guide rod 403. The screw shaft 404 is threaded in a nut 405 which is fixed to a stopper 406 slidably engaging the guide rod 403.

A vertical cylinder unit 407 is fixed to the lower surface of the bracket 401 and has a rod 407a supporting a hook 408 on its lower end. A plate 409 engageable by the hook 408 for upward movement is coupled to the cylinder unit 312 that is connected to the upper presser roll 314 of the drive roll unit 310.

The stopper 406 is elevated in advance to a certain vertical position by the rotary actuator 402. Then, the cylinder unit 407 is contracted to lift the hook 408, which engages and elevate the plate 409 and hence the upper presser roll 314. The plate 409 is continuously elevated until the hook 408 abuts against the stopper 406.

In the illustrated embodiment, one height setting mechanism 400 is not combined with each drive roll unit 310 or each free roll unit 350, but with a plurality of roll units 300, e.g., four roll units 300.

Each height setting mechanism 400 is capable of canceling the height that has been set by the stopper 406 or the plate 409. However, the glass sheets G are temporarily bonded by the roll units 300 while the established height is not being canceled by certain height setting mechanisms, indicated at 400a, 400b in FIG. 10. Such an arrangement allows the heights of the individual roll units to be easily controlled according to a numerical control process.

The free roll units 350 will now be described below with reference to FIGS. 27 through 31.

Figure 27:
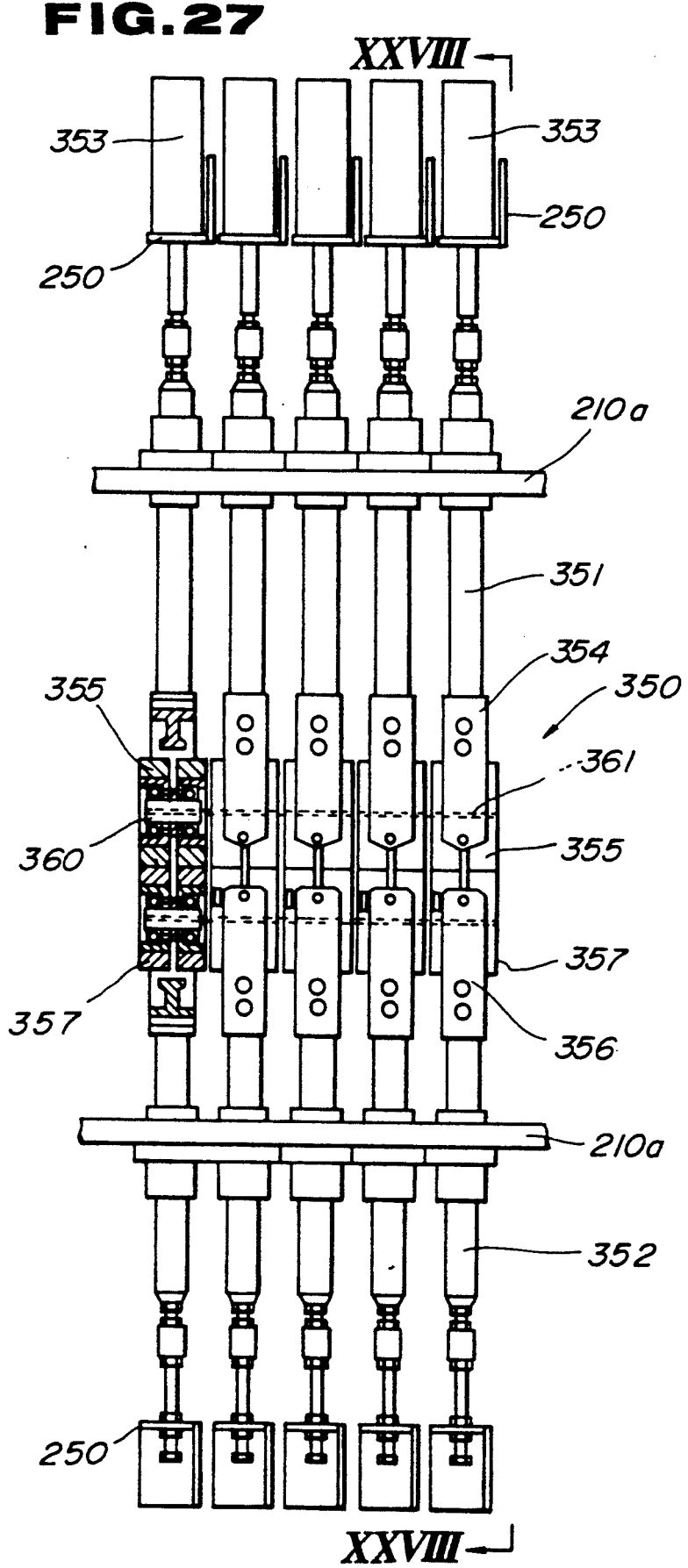
FIG. 27 is an enlarged fragmentary view of free roll units.

As shown in FIG. 27, each of the free roll units 350 has vertical shafts 351, 352 extending through the respective inner frames 210a. The shaft 351 has an upper end coupled to a cylinder unit 353 mounted on the subframe 250, and the cylinder unit 353 is coupled to a balancing cylinder mounted on the main frame 210. The lower end of the shaft 351 is positionally adjustably attached to the subframe 250.

Figure 28:
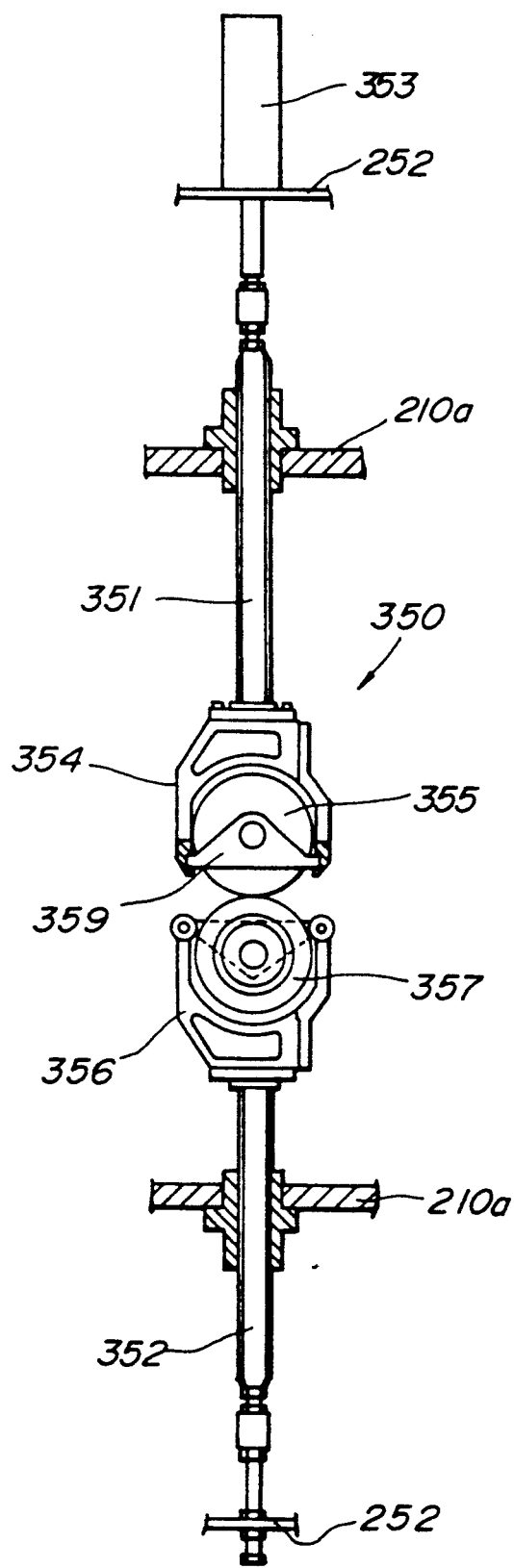
FIG. 28 is a cross-sectional view taken along line XXVIII—XXVIII of FIG. 27.

As shown in FIG. 28, the free roll unit 350 has an upper presser roll 355 supported on the lower end of the shaft 351 by a holder 354, and a lower presser roll 357 supported on the upper end of the shaft 351 by a holder 356.

Figure 29:
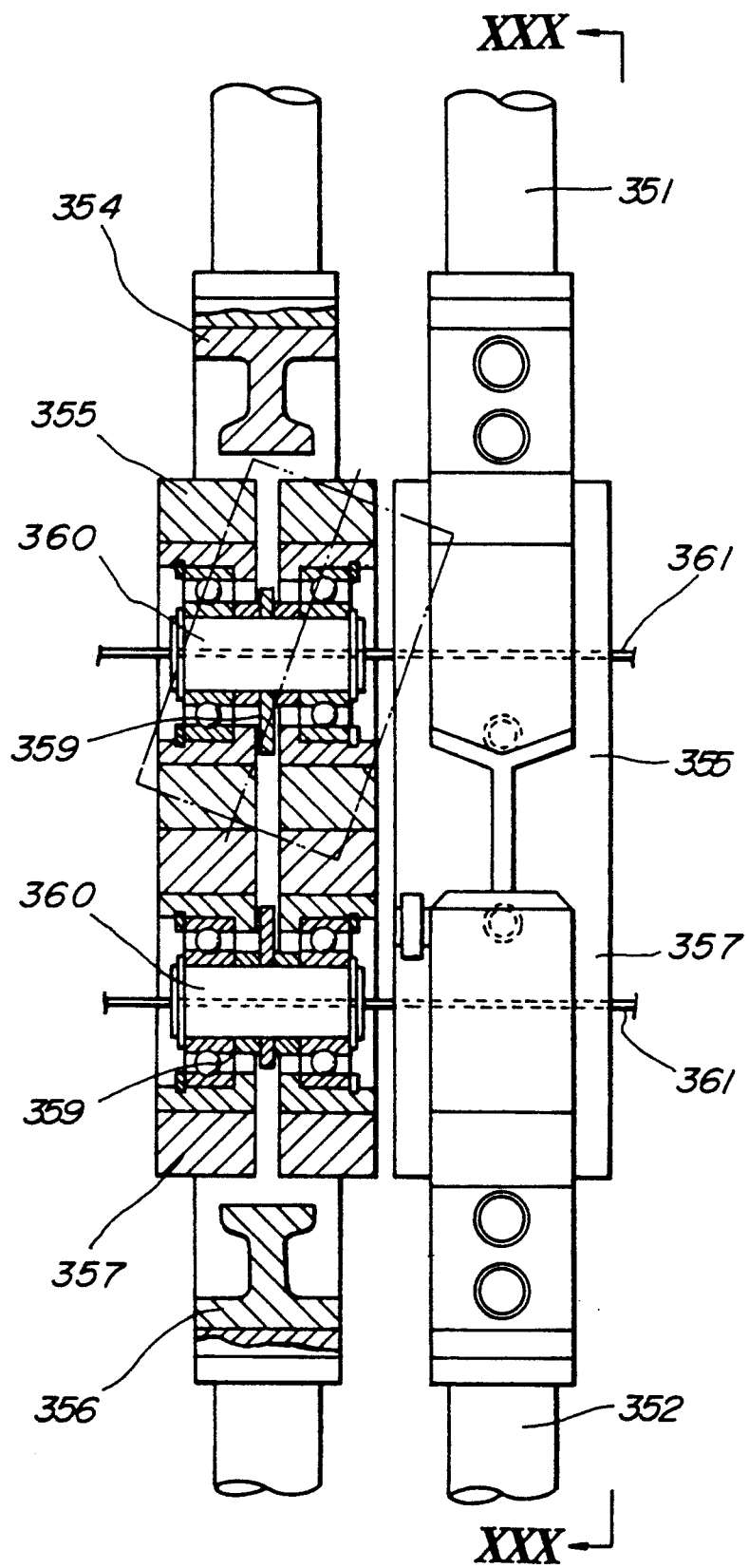
FIG. 29 is an enlarged fragmentary view of presser rolls of the free roll units.
Figure 30:
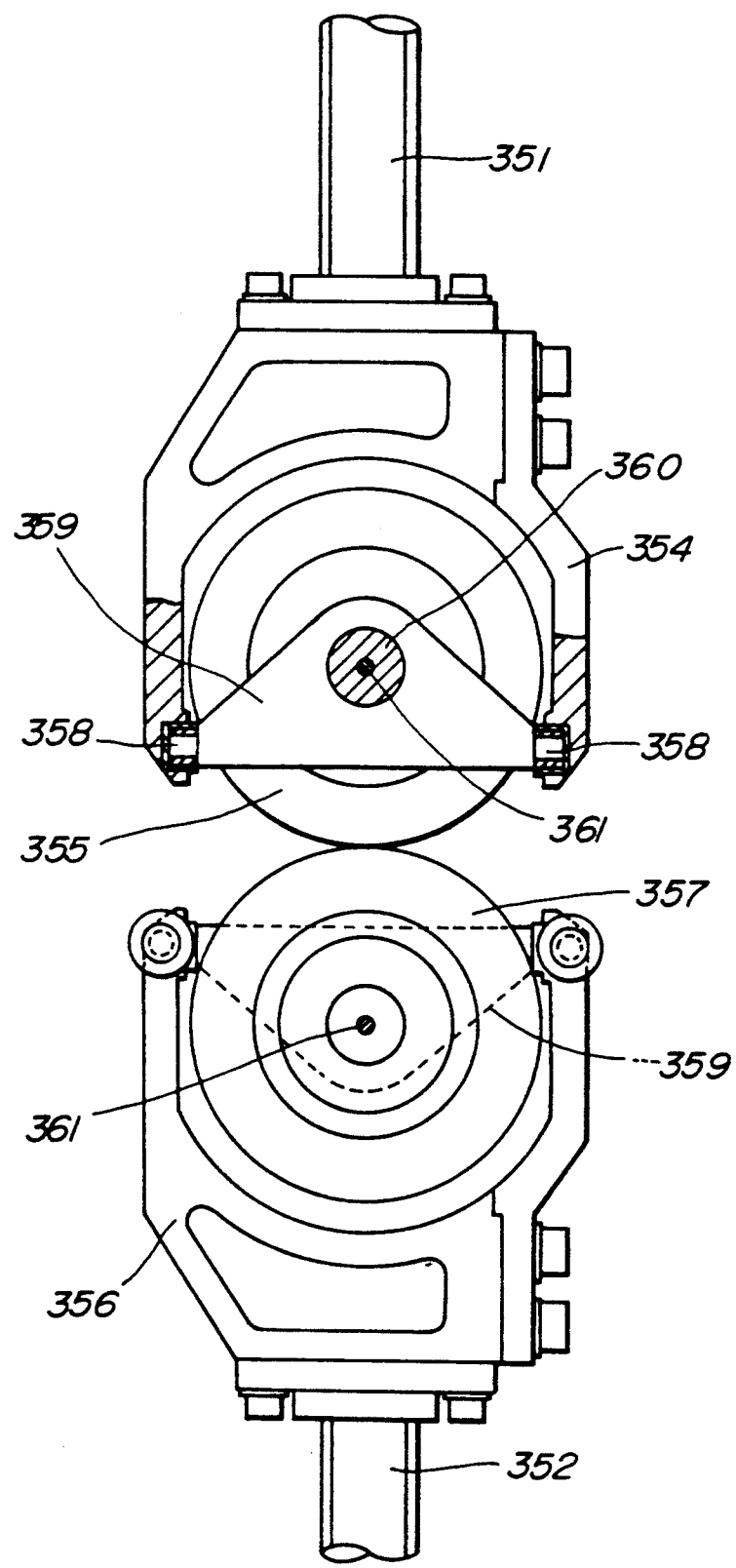
FIG. 30 is a view taken along line XXX—XXX of FIG. 29.

As shown in FIGS. 29 and 30, a triangular plate 359 is positioned between forked lower ends of the holder 354 and has opposite ends rotatably attached the lower ends of the holder 354 by respective pins 358. The upper presser roll 355 is rotatably supported on a shaft 360 extending through the triangular plate 359 near its vertex. The lower presser roll 357 is supported in the holder 356 by a similar support structure. FIG. 30 shows that the pins 358 on the holder 354 are positioned on one side of the shaft 360 closer to the lower presser roll 357, and the pins 358 on the holder 356 are positioned on one side of the shaft 360 closer to the upper presser roll 355.

As shown in FIG. 31A, when the upper and lower presser rolls 355, 357 swing in following the shape of the glass plates G, they swing about respective axes YO, i.e., the pins 358, which are closer to the glass sheets G than the axes, i.e., the shafts 360, about which the upper and lower presser rolls 355, 357 are rotatable. As a result, the upper and lower presser rolls 355, 357 press the glass sheets G therebetween in wider areas than those shown in FIG. 31B.

To prevent adjacent ones of the upper presser rolls 355 or the lower presser rolls 357 from freely swinging, a piano wire 361 extends through holes defined in the shafts 360 on which the presser rolls are rotatably supported.

The apparatus according to the present invention offers the following advantages:

(1) The drive and free roll units 310, 350 mounted in the frame 200 such that they can move vertically under very small forces applied. The frame 200 is angularly movable about the horizontal shafts 201, 202 extending from its opposite ends. The shafts 201, 202 are supported for vertical angular movement by the vertically movable members 108, 115 that are vertically movable along the support columns 104. Therefore, the drive and free roll units 310, 350 can press glass sheets G of complex shape.

(2) The presser rolls 355, 357 of the free roll units 350 are rotatable along and swingable perpendicularly to the direction in which the glass sheets G are fed, and swingable. The presser rolls 355, 357 are rotatable about the shafts 360 and swingable about the pins 358 (axes YO), the pins 358 being located closer to the glass sheets G than the shafts 360. When largely curved portions of the glass sheets G are to be pressed by the presser rolls 355, 357, the presser rolls 355, 357 held against the glass sheets G overlap each other in wider areas than the conventional presser rolls for temporarily bonding the glass sheets G more reliably.

(3) The drive and free roll units 310, 350 are vertically positionally adjustably mounted in the frame 200, and some of the drive and free roll units 310, 350 are associated with height setting mechanisms 400 for setting the height of the upper presser rolls while permitting the set height to be canceled. The height setting mechanisms 400 can set the height of the upper presser rolls for smooth insertion of the glass sheets G between the upper and lower presser rolls, and facilitate numerical control of the heights of the individual roll units.

(4) Adjacent presser rolls are prevented from freely swinging relatively to each other by piano wires extending through the shafts of the presser rolls. Accordingly, the glass sheets G can smoothly be inserted between the upper and lower presser rolls.

(5) The drive roll units 310 are supported by the frame 200 which is composed of the main frame 210 and the subframe 250. The subframe 250 comprises a plurality of subframe elements associated respectively with the roll units 300 and each supported on the main frame 210 by the balancing cylinder 311 and the balancing spring 316. The balancing cylinders 311 may be of small size, and the balancing force produced thereby varies to a small degree depending on the cylinder stroke.

(6) One of the upper and lower presser rolls of each roll unit 300 is vertically movably mounted on the subframe. Therefore, the distance between the upper and lower presser rolls can be increased for gripping the leading end of the glass sheets G. Even when the glass sheets G are of greatly curved configuration, they can reliably be introduced into the pressing station S2.

(7) The frame members 251 of the subframe elements combined with the respective roll units 300 are channel-shaped as viewed in front elevation and plan. The subframe 250 of such shape does not take up a large space and has a sufficient degree of rigidity.

(8) The upper and lower presser rolls 314, 318 of the drive roll units 310 have axially central grooves 319 providing small-diameter portions with drive sprockets or gears fixed thereto. The presser rolls 314, 318 are supported for swinging movement perpendicular to the direction in which the glass sheets G are fed. The presser rolls 314, 318 can therefore press and bond the glass sheets G reliably even when the glass sheets G are of complex shape.

(9) The upper and lower presser rolls 314, 318 of the drive roll units 310 are rotated by the upper and lower drive shafts 217, 218 that are driven by the motor 161. The presser rolls 314, 318 are thus less liable to slip against the glass sheets G. The lower drive shaft 218 is associated with the overrunning mechanism 219 for also preventing slippage of the the presser rolls 314, 318 against the glass sheets G.

(10) The pressing station S2 including the drive roll units 310 and the free roll units 350 is movable in directions normal to the direction in which the glass sheets G are fed. The pressing station S2 can thus process glass sheets G of complex shape without increasing the number of drive roll units 310.

(11) The loading station S1 has the transfer device 20 for transferring the glass sheets G on the conveyor belts 13 to the pressing station S2, the transfer device 20 being movable along the rails 25 to a position closer to the pressing station S2 than the distal end of the conveyor belts 13. The transfer device 20 has the bearing rollers 32 for lifting the glass sheets G off the conveyor belts 13 and the presser rollers 38 for holding the glass sheets G against the bearing rollers 32. The transfer device 20 can transfers the glass sheets G along a straight path toward a position between the upper and lower presser rolls 314, 318 of the drive roll units 310 without physical interference with the frame 200 and the conveyor belts 13 and also without lifting the leading end of the glass sheets G. Such operation of the transfer device 20 can easily be numerically controlled.

Although there has been described what is at present considered to be the preferred embodiment of the invention, it will be understood that the invention may be embodied in other specific forms without departing from the essential characteristics thereof. The present embodiment is therefore to be considered in all respects as illustrative, and not restrictive. The scope of the invention is indicated by the appended claims rather than by the foregoing description.

What is claimed is:

1. A press roll apparatus for temporarily or finally bonding two glass sheets with an adhesive intermediate film sandwiched therebetween to manufacture a laminated glass, said press roll apparatus comprising:
    a drive source:
    a plurality of drive roll units each having a pair of upper and lower presser rolls operatively coupled to said drive source and rotatable by said drive source for pressing the glass sheets therebetween;
    a plurality of free roll units each having a pair of upper and lower presser rolls freely rotatable for pressing the glass sheets therebetween;
    a first frame housing said drive roll units and said free roll units therein, said drive roll units and said free roll units being vertically positionally adjustably supported by said first frame, said first frame having a pair of horizontal shafts projecting outwardly;
    a second frame, said first frame being supported on said second frame by said horizontal shafts for angular movement about the horizontal shafts, said second frame having a pair of horizontally spaced vertical support columns; and
    a pair of vertically movable members vertically movably supported by said support columns, respectively, said horizontal shafts being tiltably supported by said vertically movable members for angular movement within a vertical plane containing axes of said horizontal shafts.

2. A press roll apparatus according to claim 1, wherein each of said upper and lower presser rolls of said free roll units is freely rotatable about a first axis and swingable about a second axis perpendicular to said first axis, said second axis being positioned closer to the glass sheets pressed between said upper and lower presser rolls of the free roll units than said first axis.

3. A press roll apparatus according to claim 1, further including a mechanism for setting a vertical position for at least one of said drive roll units and said free roll units while permitting the set vertical position to be canceled.

4. A press roll apparatus according to claim 1, wherein said first frame comprises a main frame and a subframe, said subframe comprising a plurality of subframe elements supporting said drive roll units, respectively, further including a plurality of balancing cylinders and a plurality of balancing springs which support said subframe elements respectively.

5. A press roll apparatus according to claim 4, wherein one of said upper and lower presser rolls of each of said free roll units is vertically movably mounted on one of said subframe elements, and the other of said upper and lower presser rolls of each of said free roll units is fixedly mounted on said one of the subframe elements.

6. A press roll apparatus according to claim 4, wherein said subframe is suspended by said main frame, said subframe elements being associated respectively with said drive roll units and said free roll units, each of said subframe elements comprising a pair of channel-shaped frame members.

7. A press roll apparatus according to claim 1, wherein each of said upper and lower presser rolls of said drive roll units has an axially central small-diameter portion, and power transmitting means including a driven member mounted on said small-diameter portion for transmitting drive power from said drive source to said presser roll, each of said upper and lower presser rolls of said drive roll units being freely rotatable about a first axis and swingable about a second axis perpendicular to said first axis.

8. A press roll apparatus according to claim 7, wherein said driven member comprises a driven sprocket smaller in diameter than said upper and lower presser rolls of said drive roll units.

9. A press roll apparatus according to claim 7, wherein said power transmitting means comprises a pair of drive shafts operatively coupled to said drive source and extending parallel to the first axes of said upper and lower presser rolls of said drive roll units.

10. A press roll apparatus for manufacturing a laminated glass from two glass sheets with an adhesive intermediate film sandwiched therebetween, comprising:

a pressing station for finally or temporarily bonding the two glass sheets with the adhesive intermediate film sandwiched therebetween under pressure;

a loading station, disposed upstream of said pressing station with respect to a direction in which the glass sheets are fed, for loading the two glass sheets with the adhesive intermediate film saidwiched therebetween into said pressing station, said loading station comprising conveyor means extending in said direction for feeding the two glass sheets with the adhesive intermediate film sandwiched therebetween, and transfer means for transferring the two glass sheets with the adhesive intermediate film sandwiched therebetween from said conveyor means to said pressing station, said transfer means comprising a pair of rails extending substantially parallel to said conveyor means, a movable member movable along said rails to a position closer to said pressing station than a distal end of said conveyor means, a plurality of bearing rollers supported on said movable member for lifting the two glass sheets with the adhesive intermediate film sandwiched therebetween off said conveyor means, and a plurality of presser rollers for holding the two glass sheets with the adhesive intermediate film sandwiched therebetween against said bearing rollers; and an unloading station, disposed downstream of said pressing station with respect to said direction, for unloading the bonded two glass sheets with the adhesive intermediate film sandwiched therebetween from said pressing station;

said pressing station comprising a plurality of drive roll units for drawing the two glass sheets with the adhesive intermediate film sandwiched therebetween from said loading station, pressing the two glass sheets with the adhesive intermediate film sandwiched therebetween, and delivering the two glass sheets with the adhesive intermediate film sandwiched therebetween to said unloading station, and a plurality of free roll units for pressing the two glass sheets with the adhesive intermediate film sandwiched therebetween according to a shape of the two glass sheets, said drive roll units and said free roll units being movable as a whole perpendicularly to said direction.

* * * * *